(12) United States Patent
Liu et al.

US009116220B2

(10) Patent No.: US 9,116,220 B2
(45) Date of Patent: Aug. 25, 2015

(54) TIME SYNCHRONIZING SENSOR CONTINUOUS AND STATE DATA SIGNALS BETWEEN NODES ACROSS A NETWORK

(75) Inventors: Shao Liu, Bellevue, WA (US); Mark Finocchio, Redmond, WA (US); Avi Bar-Zeev, Redmond, WA (US); Jeffrey Margolis, Seattle, WA (US); Jason Flaks, Redmond, WA (US); Robert Crocco, Jr., Seattle, WA (US); Alex Aben-Athar Kipman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 794 days.

(21) Appl. No.: 12/979,140

(22) Filed: Dec. 27, 2010

(65) Prior Publication Data

US 2012/0163520 A1 Jun. 28, 2012

(51) Int. Cl.
*H04J 3/16* (2006.01)
*G01S 5/00* (2006.01)
*G01S 19/03* (2010.01)
(Continued)

(52) U.S. Cl.
CPC .............. *G01S 5/0018* (2013.01); *A63F 13/06* (2013.01); *A63F 13/12* (2013.01); *G01D 21/00* (2013.01); *G01S 19/03* (2013.01); *G06F 3/011* (2013.01); *G06F 3/017* (2013.01); *G06F 3/0304* (2013.01); *G06F 3/038* (2013.01); *A63F 2300/10* (2013.01); *H04J 3/0667* (2013.01); *H04W 84/18* (2013.01)

(58) Field of Classification Search
CPC ....................................................... H04L 29/06
See application file for complete search history.

(56) References Cited

U.S. PATENT DOCUMENTS 6,852,083 B2 * 2/2005 Caro et al. .................... 600/485
7,136,934 B2 11/2006 Carter et al.
(Continued)

FOREIGN PATENT DOCUMENTS

CN 101316279 A 12/2008
CN 101833452 A 9/2010

OTHER PUBLICATIONS

Al-Shaer, Ehab, Hussein Abdel-Wahab and Kurt Maly. A Scalable Monitoring Architecture for Managing Distributed Multimedia Systems. Proceedings of the IFIP/IEEE International Conference on Management of Multimedia Networks and Services held in Montreal, California in Jul. 1997, pp. 1-12. Chapman & Hall: New York, NY, USA.
Response to Office Action dated Nov. 28, 2014, Chinese Patent Application No. 2011104431262.
(Continued)

*Primary Examiner* — Brandon Renner
*Assistant Examiner* — Abdelnabi Musa
(74) *Attorney, Agent, or Firm* — Brandon Roper; Judy Yee; Micky Minhas

(57) ABSTRACT

Techniques are provided for synchronization of sensor signals between devices. One or more of the devices may collect sensor data. The device may create a sensor signal from the sensor data, which it may make available to other devices upon a publisher/subscriber model. The other devices may subscribe to sensor signals they choose. A device could be a provider or a consumer of the sensor signals. A device may have a layer of code between an operating system and software applications that processes the data for the applications. The processing may include such actions as synchronizing the data in a sensor signal to a local time clock, predicting future values for data in a sensor signal, and providing data samples for a sensor signal at a frequency that an application requests, among other actions.

11 Claims, 28 Drawing Sheets

(51) Int. Cl.
  *A63F 13/20* (2014.01)
  *A63F 13/30* (2014.01)
  *G01D 21/00* (2006.01)
  *G06F 3/01* (2006.01)
  *G06F 3/03* (2006.01)
  *G06F 3/038* (2013.01)
  *H04J 3/06* (2006.01)
  *H04W 84/18* (2009.01)

(56) References Cited

U.S. PATENT DOCUMENTS

| | | | |
|---|---|---|---|
| 7,257,764 | B2 | 8/2007 | Suzuki et al. |
| 2004/0015103 | A1 | 1/2004 | Aminian et al. |
| 2005/0010139 | A1 | 1/2005 | Aminian et al. |
| 2005/0234309 | A1* | 10/2005 | Klapper ............... 600/300 |
| 2007/0032748 | A1* | 2/2007 | McNeil et al. ........ 600/595 |
| 2007/0140303 | A1* | 6/2007 | Kim et al. ............ 370/503 |
| 2008/0256553 | A1 | 10/2008 | Cullen |
| 2008/0285805 | A1* | 11/2008 | Luinge et al. ......... 382/107 |
| 2009/0111582 | A1* | 4/2009 | Schuler et al. ......... 463/42 |
| 2009/0168760 | A1* | 7/2009 | Katis et al. ........... 370/352 |
| 2009/0259711 | A1 | 10/2009 | Drieu et al. |
| 2010/0106846 | A1 | 4/2010 | Noldus et al. |
| 2010/0153577 | A1 | 6/2010 | Wohlert et al. |
| 2010/0165205 | A1 | 7/2010 | Namioka |
| 2011/0214030 | A1* | 9/2011 | Greenberg et al. ...... 714/748 |
| 2011/0255528 | A1* | 10/2011 | Zakrzewski ........... 370/350 |
| 2012/0008514 | A1* | 1/2012 | Ponnuswamy .......... 370/252 |
| 2012/0134282 | A1* | 5/2012 | Tirronen et al. ........ 370/252 |

OTHER PUBLICATIONS

English translation of Amended Claims filed in Response to Office Action dated Nov. 28, 2014, Chinese Patent Application No. 2011104431262.
Supplemental Response to Office Action dated Dec. 5, 2014, Chinese Patent Application No. 2011104431262.
English translation of Amended Claims filed in Response to Office Action dated Dec. 5, 2014, Chinese Patent Application No. 2011104431262.
English Abstract of Chinese Publication No. CN101833452 published on Sep. 15, 2010.
English Abstract of Chinese Publication No. CN101316279 published on Dec. 3, 2008.
Chinese Office Action dated Mar. 25, 2014, Chinese Patent Application No. 201110443126.2.
Response to Office Action dated Aug. 8, 2014, Chinese Patent Application No. 201110443126.2.
English translation of the Amended claims (Clean and marked-up) filed in Response to Office Action dated Aug. 8, 2014, Chinese Patent Application No. 201110443126.2.
Chinese Office Action dated Sep. 17, 2014, Chinese Patent Application No. 201110443126.2.
Response to Office Action dated Feb. 12, 2015, Chinese Patent Application No. 201110443126.2.
English translation of Amended Claims filed in Response to Office Action dated Feb. 12, 2015, Chinese Patent Application No. 201110443126.2.
"Third Office Action Issued in Chinese Patent Application No. 201110443126.2", Mailed Date: Jan. 7, 2015, 6 Pages.

\* cited by examiner

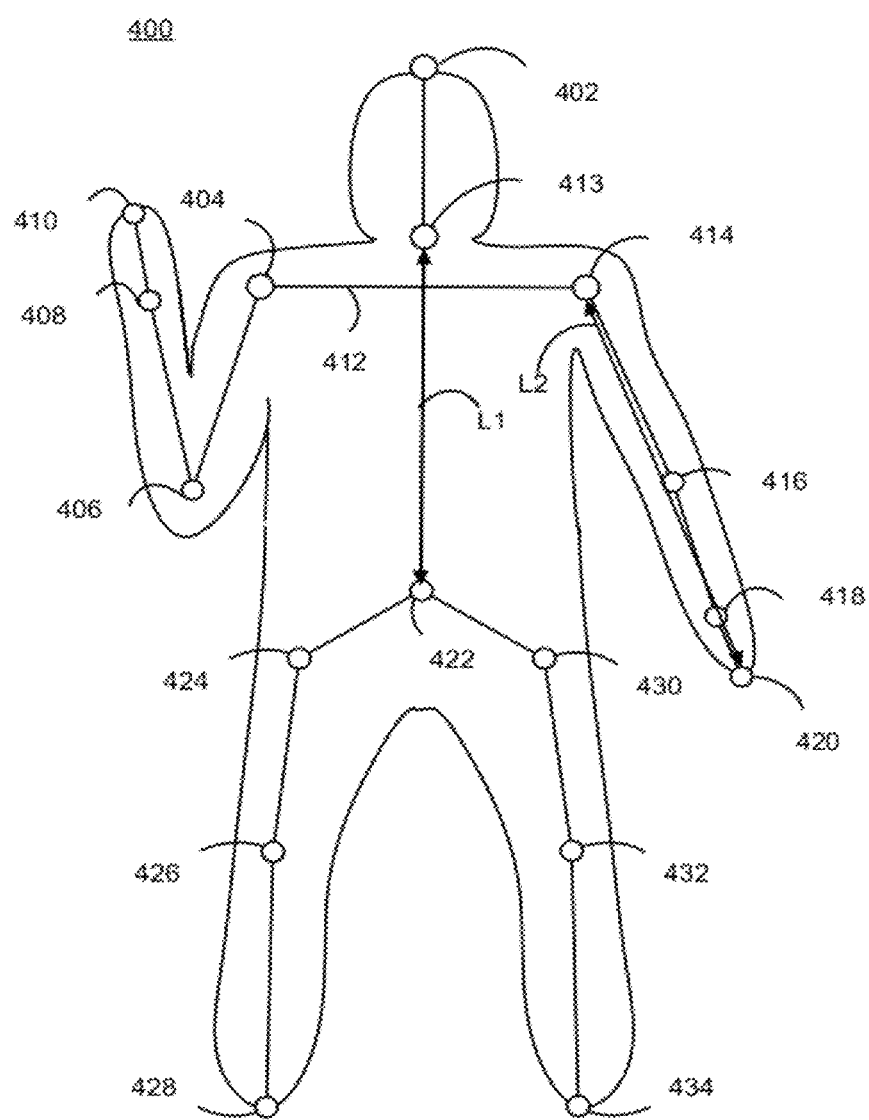

352

| Data Sample n | Time stamp n |
|---|---|
| ... | ... |
| Data Sample 3 | Time stamp 3 |
| Data Sample 2 | Time stamp 2 |
| Data Sample 1 | Time stamp 1 |

| command y | Time stamp 9 |
|---|---|
| command x | Time stamp 2 |

| Frame n | Time stamp n |
|---|---|
| ... | ... |
| Frame 3 | Time stamp 3 |
| Frame 2 | Time stamp 2 |
| Frame 1 | Time stamp 1 |

Fig. 4C

| Published signals/subscribed devices 303 | | |
|---|---|---|
| Signal x | Signal y | Signal z |
| Device m | Device m | Device i |
| Device p | Device q | Device m |
| Device q | - | Device q |
| - | - | Device z |

Fig. 5A

| Subscriptions/publishers 307 | |
|---|---|
| Signal C | Device C |
| Signal B | Device B |
| Signal A | Device A |

Fig. 5B

| Signal | Publisher 312 | Subscribers 314 |
|---|---|---|
| Signal A | Device A | Device list |
| Signal B | Device Q | Device list |
| Signal C | Device B | Device list |
| Signal D | Device B | Device list |

Fig. 5C

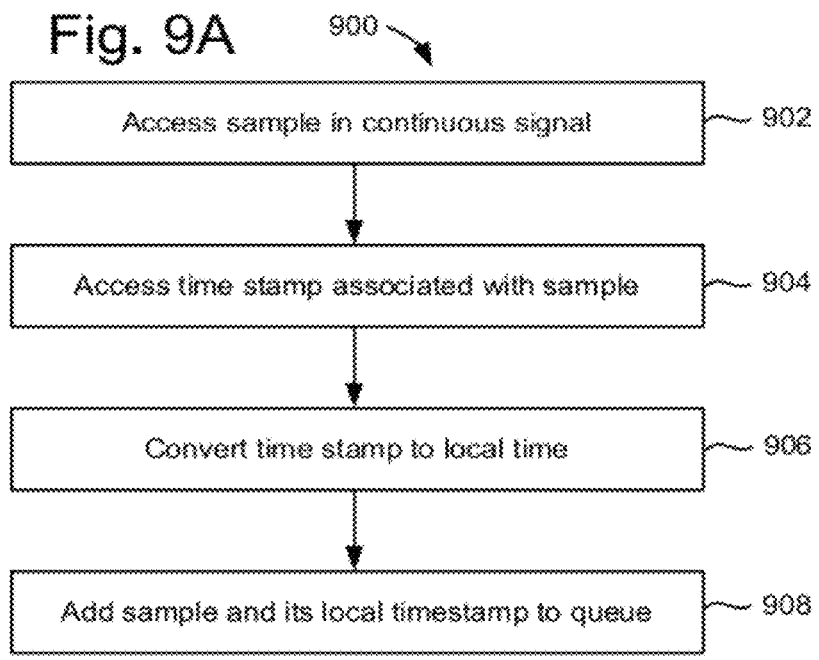
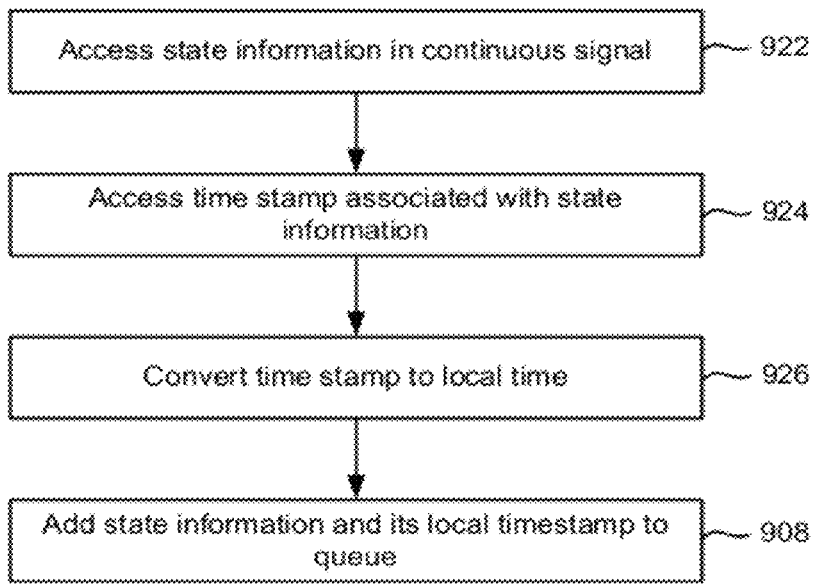

TIME SYNCHRONIZING SENSOR CONTINUOUS AND STATE DATA SIGNALS BETWEEN NODES ACROSS A NETWORK

BACKGROUND

A wide variety of sensor data may be collected by electronic devices. Examples of different sensors include, but are not limited to, global position satellite (GPS) sensors, cameras (RGB and depth), remote controls, game controls, and user input devices (e.g., keyboards, mice, etc.).

Attempting to share sensor data between different electronic devices presents challenges. One challenge is that the sensor data can have a wide variety of data formats. Therefore, a device that receives sensor data from another device may not know how to work with the sensor data. For example, a software application running on a device may be unable to handle sensor data from another device. Given the wide variety of possible data formats, it may be impractical for a software developer to write and test their application such that is it compatible with different data formats.

SUMMARY

Techniques are provided for sharing sensor data among devices. A publisher/subscriber model may be used to allow devices to learn of sensor signals that are available from other devices and subscribe to those of interest. The sensor signals may be classified to allow devices to easily determine what signals may be of interest and know how to process the sensor signals. The subscribing device may have a layer of software between the operation system and software applications to handle details of synchronizing the sensor data for use by the applications. Therefore, developers of the applications need not focus on details of handling disparate types of sensor data and time synchronizing the sensor data to a local clock.

One embodiment includes a method of a device subscribing to and receiving a sensor signal. A first device may determine which sensor signals are available over one or more networks. Each of the sensor signals may be available from another device that has a sensor from which the sensor signal is derived. The first device subscribes to one of the sensor signals. The first device receives the subscribed to sensor signal(s) over the one or more networks. The subscribed to sensor signal includes timing information and data based on sensor data. Data in the subscribed to sensor signal is processed at the first device to make it compatible for an application running on the first device. The processing is performed by software code other than the application.

One embodiment includes a method of publishing and providing a sensor signal. A first device may publish that one or more sensor signals that are based on sensor data are available. A second device then requests to and is subscribed to one of the sensor signals. The first device collects sensor data and creates the first signal based on the sensor data. The first signal includes timing information associated with the collected sensor data. The first sensor signal is provided to the second device over one or more networks.

One embodiment includes an apparatus that may subscribe to a sensor signal, which may be processed and provided to an application running on the apparatus. The apparatus may include a processor and a computer readable storage medium coupled to the processor. The computer readable storage medium may have instructions stored thereon which, when executed on the processor, cause the processor to perform the following. The processor determines which sensor signals are available over one or more networks. The sensor signals are based on sensor data. The sensor signals include a first type of signal for continuous time signals and a second type of signal for state signals. The processor subscribes to a first sensor signal of the sensor signals. The processor establishes a common time reference with a device that publishes the first sensor signal. The processor receives the first sensor signal over the one or more networks. The first sensor signal includes timing information and information based on sensor data. The processor synchronizes the data in the first sensor signal to a local clock using the common time reference. The processor provides the synchronized data to an application running on the apparatus.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

FIG. 2A depicts an example model of a user that may be described in one embodiment of a skeletal signal.

FIGS. 4A, 4B, and 4C depict further details of embodiments of data queues of FIG. 3C.

FIG. 5A is a diagram depicting one embodiment of a data structure that lists sensors signals that a device publishes and subscribers to each sensor signal.

FIG. 5B is a diagram depicting one embodiment of a data structure that lists sensor signals to which a device has subscribed and the publishing device.

FIG. 5C is a diagram depicting one embodiment of a data structure that stores signal directory the subscriber lists.

FIG. 9A is a flowchart of one embodiment of a process of processing a continuous signal.

FIG. 9B is a flowchart of one embodiment of a process of processing a state signal.

DETAILED DESCRIPTION

Techniques are provided for synchronization of sensor signals between devices. One or more of the devices may collect sensor data. A publishing device may create a sensor signal from the sensor data, which it may make available to other devices upon a publisher/subscriber model. The other devices may subscribe to whatever sensor signals they choose. Any of the devices could be a provider (e.g., publisher) or a consumer (e.g., subscriber) of the sensor signals. Thus, for example, various sensor signals could be easily shared among the devices. A device may have a layer of code between the operating system and software applications that processes the data for the applications. The processing may include such actions as synchronizing the data in a sensor signal to a local time clock, predicting future values for data in a sensor signal, and providing data samples for a sensor signal at a frequency that an application requests, among other actions.

For example, one device might collect sensor data from one or more cameras. This device might form a "skeletal signal" from this sensor data. For example, the skeletal signal might describe the motion of a user in terms of a skeletal model. This skeletal signal may include data samples for different points in time, and may be referred to herein as a type of "continuous signal." The device might also collect user input from a remote control, game control, etc. The device might form a "state" signal, based on this input. For example, the state signal might describe the various commands that the user inputs with the control. This type of signal may be referred to herein as a "state signal," as it may contain state information. Other types of sensor signals may also be transferred.

Figure 1A:
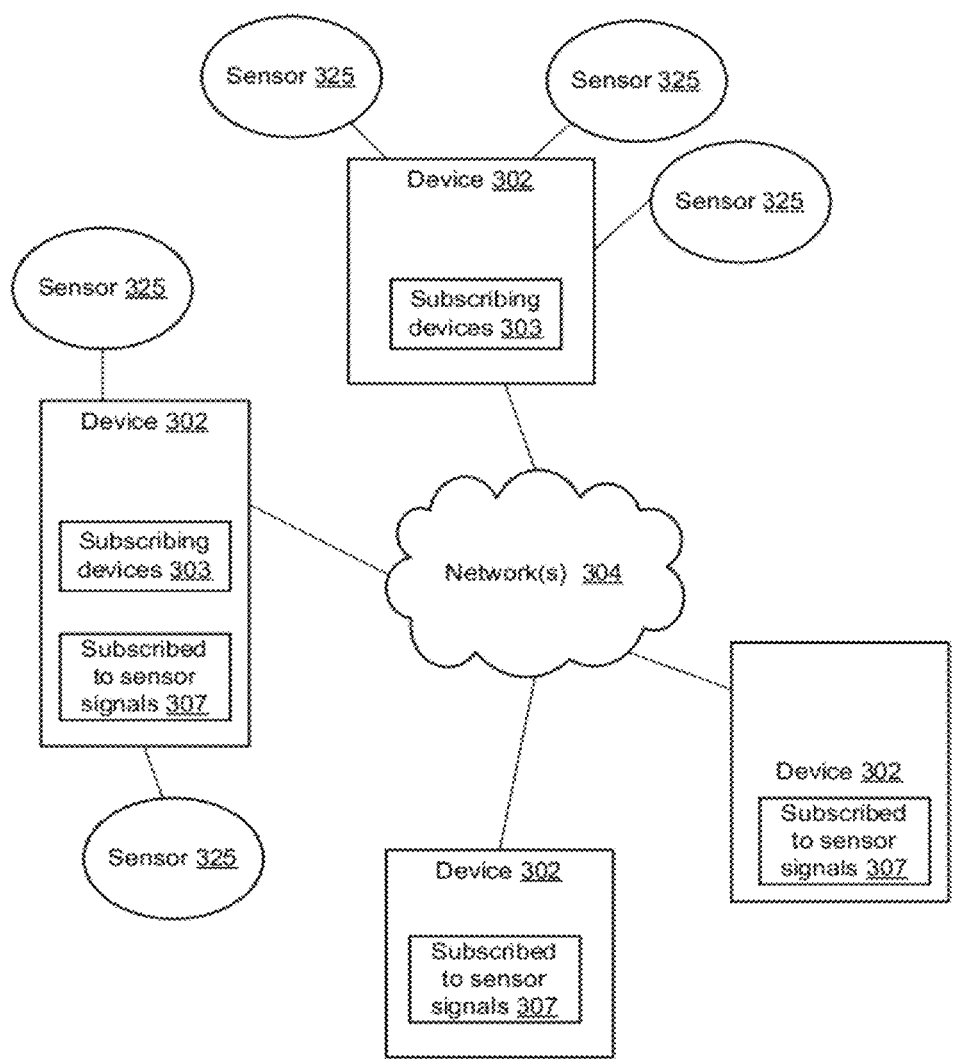
FIG. 1A is an example system in which embodiments may be practiced.

FIG. 1A is an example system in which embodiments may be practiced. Several devices 302 are connected by one or more networks 304. The one or more networks 304 may include a local area network (LAN). In one embodiment, the one or more networks 304 include a wide area network (WAN). For purposes of this disclosure, the Internet may be considered to be a WAN. Thus, two or more of the devices 302 may be in the same location, such as someone's home. However, at least one of the devices 302 could be remote. For example, one device 302 might be in one user's home and another device 302 on another user's home. In one embodiment, at least some of the devices 302 operate as a peer-to-peer network. There may or may not be a master/slave relationship among device 302.

The devices 302 may be different types of electronic devices. For example, the devices 302 may include, but are not limited to, a cellular telephone, a personal computer, a gaming system, or a notepad computer. At least some of the devices 302 might run different operating systems.

One or more of the devices 302 collects sensor data, forms one or more sensor signals from the collected data, and makes those sensor signal(s) available to the other devices 302. The sensor signal that is made available is not necessarily raw sensor data, although that is an option. Rather, the sensor signal may be generated based on the raw sensor data (such as skeletal data discussed herein). A device 302 may publish the sensor signals that it makes available such that other devices 302 may subscribe to that sensor signal. For example, each of the devices 302 may listen for a broadcast to determine what sensor signals are available. A device 302 may also send a query to another device 302 to determine what sensor signals the other device makes available. The subscribing device does not need to know beforehand what the format for the sensor signal has. Rather, the publishing device might send metadata that describes the format for the sensor signal.

Herein, the term "publishing device" is used to refer to a device that in the context of the discussion is publishing a signal. The term "subscribing device" is used to refer to a device that in the context of the discussion subscribes to a signal. A single device may both publish and subscribe. Thus, in one context a device might be referred to as a publishing device and in another context that same device might be referred to as a subscribing device. Therefore, it will be understood that this terminology is used for convenience of discussion. A device 302 that publishes a sensor signal may keep track of subscribing devices 302 by constructing a list of subscribing devices 303. A device 302 that subscribes a sensor signal may keep track of these signals and their publishers by constructing a list of subscribed to signals 307.

A subscribing device 302 may have a mechanism for time synchronizing to a publishing device 302. Numerous techniques may be used. One technique for time synchronizing is the network time protocol (NTP). However, another technique may be used. The time synchronizing may help a device 302 that receives one or more sensor signals to correlate the sensor signal to a local time clock. Note that there may be some delay before the receiving device is able to receive and process the sensor signal. Therefore, if the sensor signal is representing some real-time event at one device 302, then the subscribing device 302 may obtain it after some delay. When a device 302 provides a sensor signal, it may also provide timing information with that sensor signal. In one embodiment, the subscribing device 302 is able to synchronize the data in the sensor signal with its local clock. Note that if the subscribing device 302 receives more than one sensor signal, it may be able to synchronize these two sensor signals with each other.

There may be changes to that network latency over time. Therefore, just using the sensor signal as it arrives may not result in correct behavior. Moreover, it may not be sufficient to simply rely on a time stamp in the sensor signal, as there may be some significant delay between when the sensor data was collected at the publishing device and received (or utilized) by the subscribing device.

The following example will help to illustrate. One of the devices 302 may have one camera sensor that collects depth information and another camera sensor that collects RGB information. That device 302 may also have a user input device, such as a game control. That device 302 might use the camera sensor data to track the position of a user interacting with an application running on the device 302. From the tracked data, the device 302 might build a skeletal signal, as one example. A skeletal signal may contain information that describes the relative position and motion of the user's skeleton over time. As one example, the skeletal signal may include a number of data samples, wherein each data sample corresponds to some point in time. The skeletal signal is one example of what is referred to herein as a continuous signal. The device 302 may publish that it makes skeletal signals available. Therefore, any of the other devices 302 may subscribe to the skeletal signal. The skeletal signal may have a well-defined format, which may be provided to a subscribing device via metadata. The device 302 may also make a sensor signal available that contains some state information, such as commands entered by a user. This "state signal" may include a description of commands that a user entered with the game control (and possibly other user input devices). The state signal may also include a time stamp associated with each command to indicate when the command was entered by the user. Note that by characterizing signals as, for example, continuous or state, a subscribing device is able to determine how it might process and use the sensor signal.

A subscribing device 302 may send a subscription request to the publishing device for one of these sensor signals. As the subscribing device 302 receives the skeletal signal and the state signal, the subscribing device 302 may buffer these sensor signals. As noted, these sensor signals may contain timing information, such as time stamps. The subscribing device may convert those time stamps to local time. Therefore, samples in the skeletal signal may be associated with time at the local device. Likewise, the commands may be associated with time at the local device.

Because there may be some delay, the data in the received signals may be somewhat behind the time at the local device. In one embodiment, the subscribing device predicts future values for a sensor signal. For example, the device 302 may predict future values for the skeletal data based on previous samples.

Figure 1B:
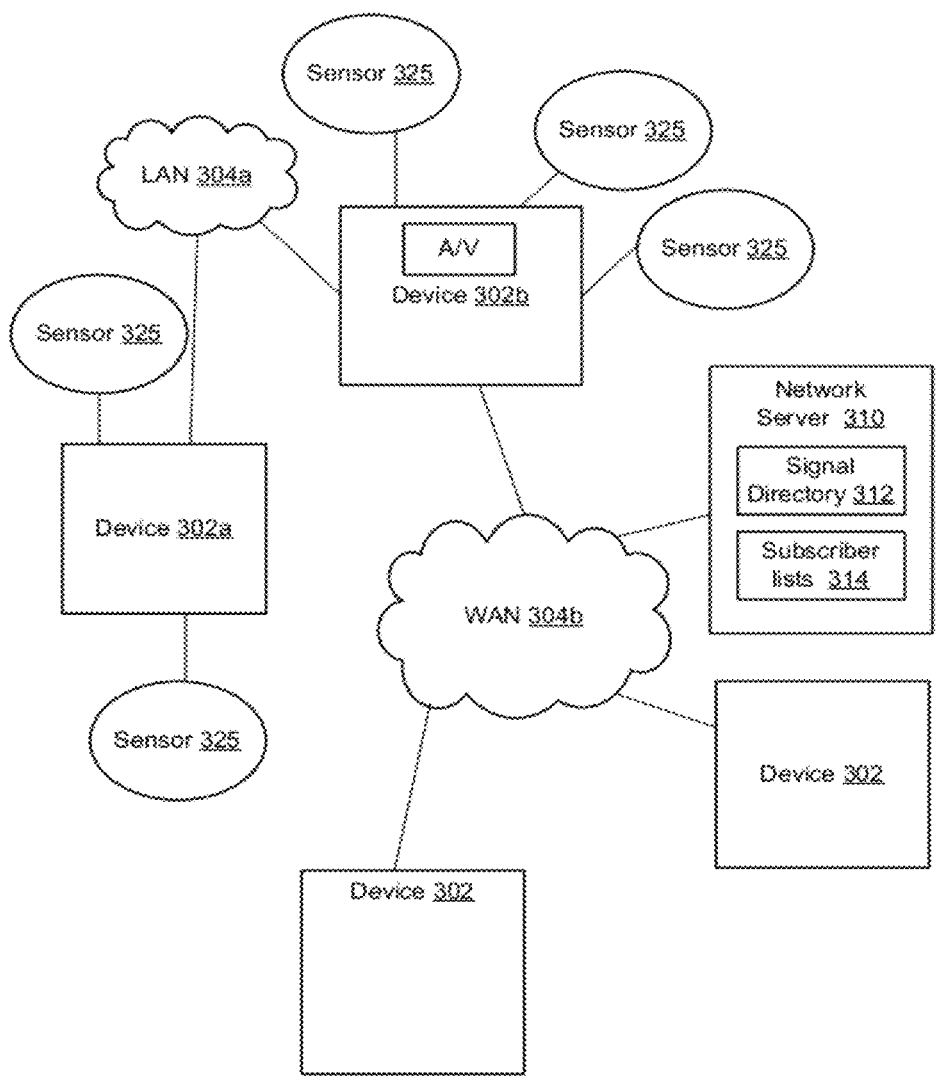
FIG. 1B is an example system in which embodiments may be practiced.

FIG. 1B is a diagram of one embodiment of a system for synchronizing sensor data between devices 302. In FIG. 2, a network server 310 may act as a clearinghouse for the sensor signals. The network server 310 may be connected to the WAN 304b to allow a device 302 to inform it that it publishes a sensor signal. The network server 310 may store a sensor signal directory 312 that lists the various sensor signals that are available from the various devices 302. Devices 302 may send subscription requests to the network server 310. Thus, the network server 310 may construct a subscriber list 314 for each sensor signal. The publisher of a sensor signal may send that sensor signal to the network server 310, such that the network server 310 may forward the sensor signal to the appropriate subscribing devices 302.

Devices 302 may also be connected by a LAN 304a in this embodiment. In this case, one device 302 may act on the behalf of another device to communicate with the network server 310. For example, devices 302a and 302b may communicate over the LAN 304a. Device 302b may communicate with the network server 310. If device 302a needs to publish its signals, it may do so by communicating (e.g., broadcasting) on the LAN 304a. Then, device 302b may forward this information to the network server 310. When device 302a is providing its sensor signals, it may send them to device 302b, which may forward them to the network server 310.

In one embodiment, the sensor signals that are available may be classified into different types. This classification may aid the subscribing devices 302 in knowing which sensor signals may be of interest and in determining how to utilize the sensor signals. One example type of sensor signal may be referred to as a "continuous signal." A continuous signal may be one that includes a number of data samples. A data sample in a continuous signal may have a floating point data, but that is not a requirement. Example sensors 325 used to collect data upon which continuous signals may be based include, but are not limited to, depth camera, RGB camera, or global position satellite (GPS) sensor. Note that the data that comes directly from the sensor might not be classified as a continuous signal. In some embodiments, the subscriber to a continuous signal may predict future values for the data. This may help the subscribing device to compensate for delays in receiving the sensor signal.

FIG. 2A depicts an example model 400 of a user that may be described in one embodiment of a skeletal signal. The model 400 includes a number of reference points, such as the top of the head 402, bottom of the head or chin 413, right shoulder 404, right elbow 406, right wrist 408 and right hand 410, represented by a fingertip area, for instance. Another approach is to represent the hand position by a central point of the hand. The model 400 also includes a left shoulder 414, left elbow 416, left wrist 418 and left hand 420, represented by a fingertip area, for instance. A waist region 422 is also depicted, along with a right hip 424, right knew 426, right foot 428, left hip 430, left knee 432 and left foot 434. A shoulder line 412 is a line, typically horizontal, between the shoulders 404 and 414.

A size of the user can be determined based on the reference points. For example, a torso height L1 can be defined between the chin 413 and the waist 422, and an arm length L2 can be defined as a sum of the distances between the left shoulder 414 and the left elbow 416, and between the left elbow 416 and the left hand 420. The length of the shoulder line, between 404 and 414, can also be used.

In one embodiment, each data sample in a skeletal signal defines a coordinate for each reference point. The coordinate might be (x, y, z), or some other coordinate system. A skeletal signal could have a certain number of data samples each second. For example, a skeletal signal might have 30 data samples per second. Thus, the skeletal signal itself is not continuous in the sense of having values for all points in time (as might be the case if a particular reference point were described by an equation). Thus, it will be understood that the term "continuous signal" does not require that the sensor signal itself have values for all points in time. It may be the case that the underlying subject matter (e.g., position of elbow) does have values for all points in time, but this is not a requirement. In some embodiments, a subscribing device 302 able to predict future values (e.g., extrapolate) for a continuous signal. In some embodiments, a subscribing device 302 able to determine values for points in time other than the time that corresponds to the data samples of a continuous signal (e.g., interpolate).

Another example type of sensor signal is a "state signal". A state signal could be derived from a user input device such as a remote control or mouse. However, in some cases a state signal could be derived from a sensor such as a camera or microphone. For example, a system might use hand signal recognition or voice recognition to determine commands. A subscribing device 302 is not necessarily able to predict future values for a state signal.

Another example of a type of sensor signal is a "binary signal." As one example, this may be used to transmit sensor data in binary format. For example, RGB data from a camera might be transmitted.

Figure 2B:
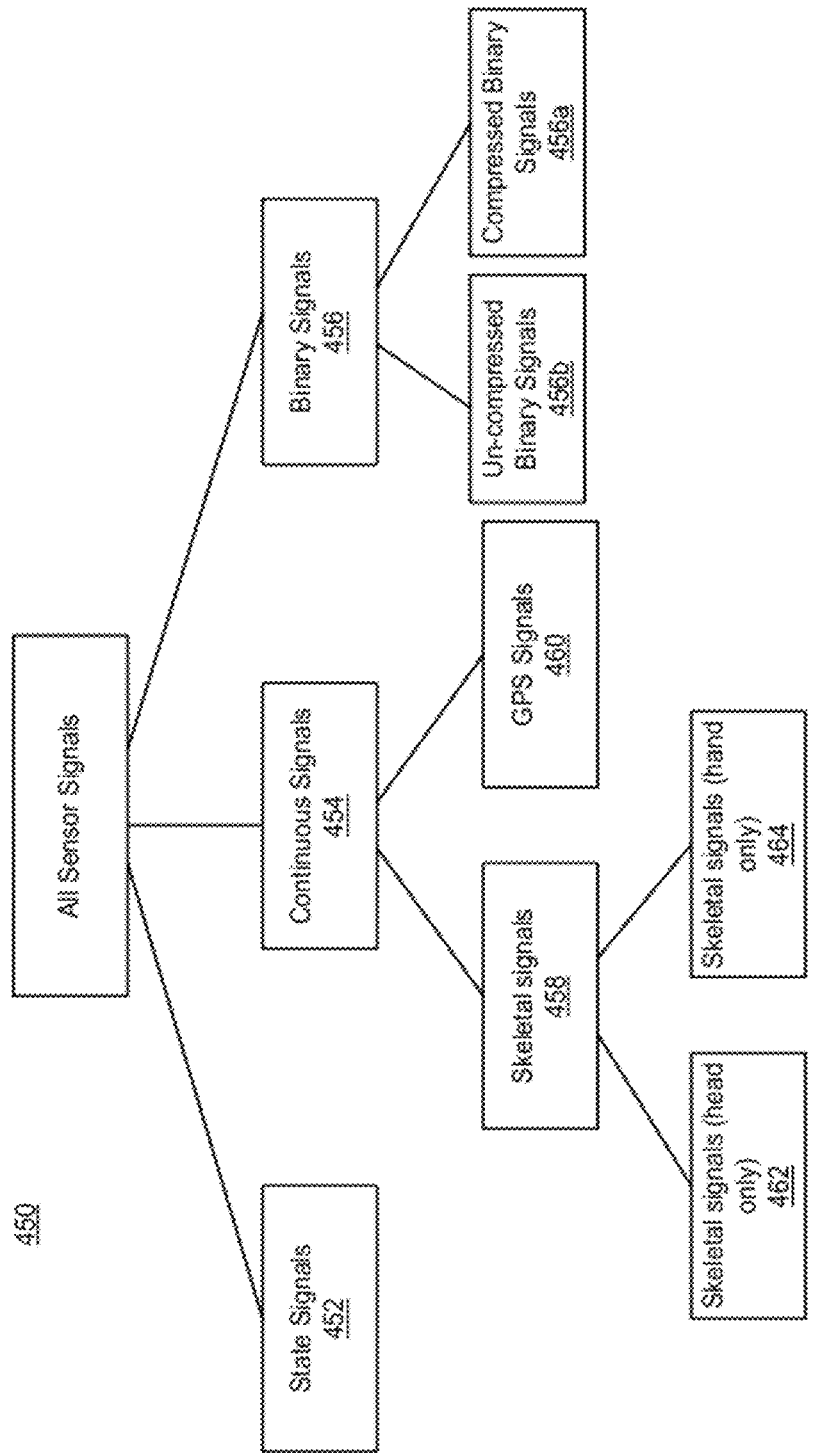
FIG. 2B depicts an example hierarchy of one embodiment of sensor signal types.

FIG. 2B depicts an example hierarchy 450 of one embodiment of sensor signal types. The hierarchy 450 includes state signals 452, continuous signals 454, and binary signals 456. There may be other types of signals at this level. Example continuous signals are "skeletal signals" 458 and "GPS signals" 460. The skeletal signals 458 may be further broken down. In this example, there is a skeletal signal that only contains data for the head 462 (which might be used to determine direction of gaze), and another skeletal signal, which only contains data for hands 464 (which might be used for hand signals). Note that some of the continuous signals 454 might be formed based on data collected from sensors 325, such as a depth camera. However, data that comes directly from the depth camera might be classified as a binary signal 456. As noted in FIG. 2A, binary signals 456 may be divided into compressed binary signals 456a and un-compressed binary signals 456b. There may be many other types of sensor signals in the hierarchy, but they are not depicted so as to not obscure the diagram. In some embodiments, the sensor signals are part of a common namespace, such that different devices 302 may easily operate with the sensor signals.

Figure 3A:
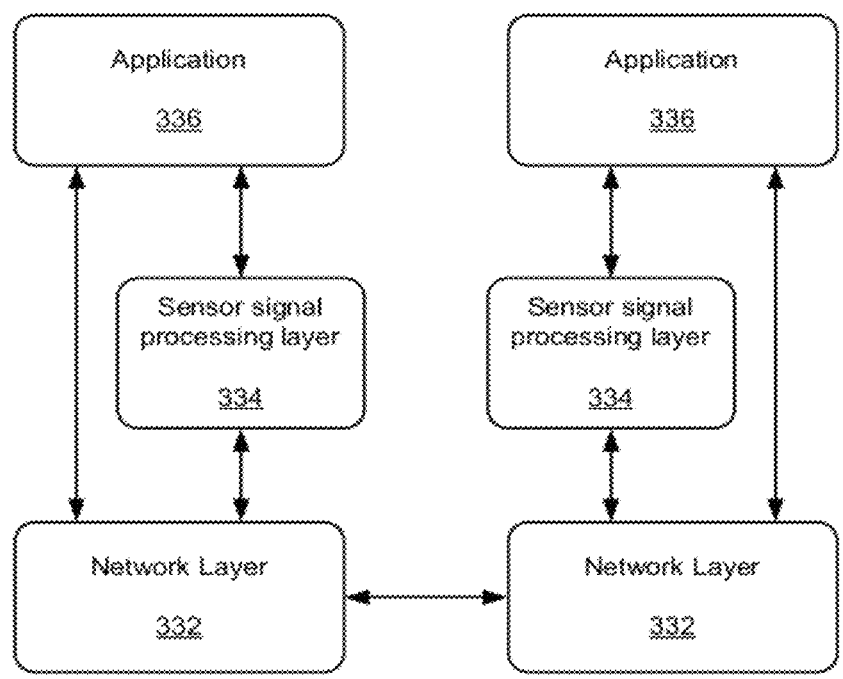
FIG. 3A is a diagram of one embodiment of different layers of code in two devices that may exchange sensor signals.

In some embodiments, a device 302 may have a layer of software that handles details of processing signals from other devices 302, such that software applications that utilize the signals do not need to handle details such as synchronizing the data a local clock, accounting for time delays, etc. The software may also handle details of working with different data formats for different sensor signals, so that the application does not need to. FIG. 3A is a diagram of one embodiment of different layers of code in two devices 302 that may exchange sensor signals. Each device 302 in this example may be a publisher and/or a subscriber. For example, a device 302 might publish some sensor signals and subscribe to others. The network layer 332 in each device is used for exchanging data. In one embodiment, the devices 302 communicate using the user datagram protocol (UDP). The sensor signal processing layer 334 may be used to time synchronize the data in the sensor signal to a local clock. The sensor signal processing layer may also be used to predict future values for continuous signals, as well as to provide the application 336 with samples at the desired frequency. Further details of time synchronization are discussed below. The application 706 may be a software application that uses the sensor data. For example, the application 706 might use the sensor data to render an image.

Figure 3B:
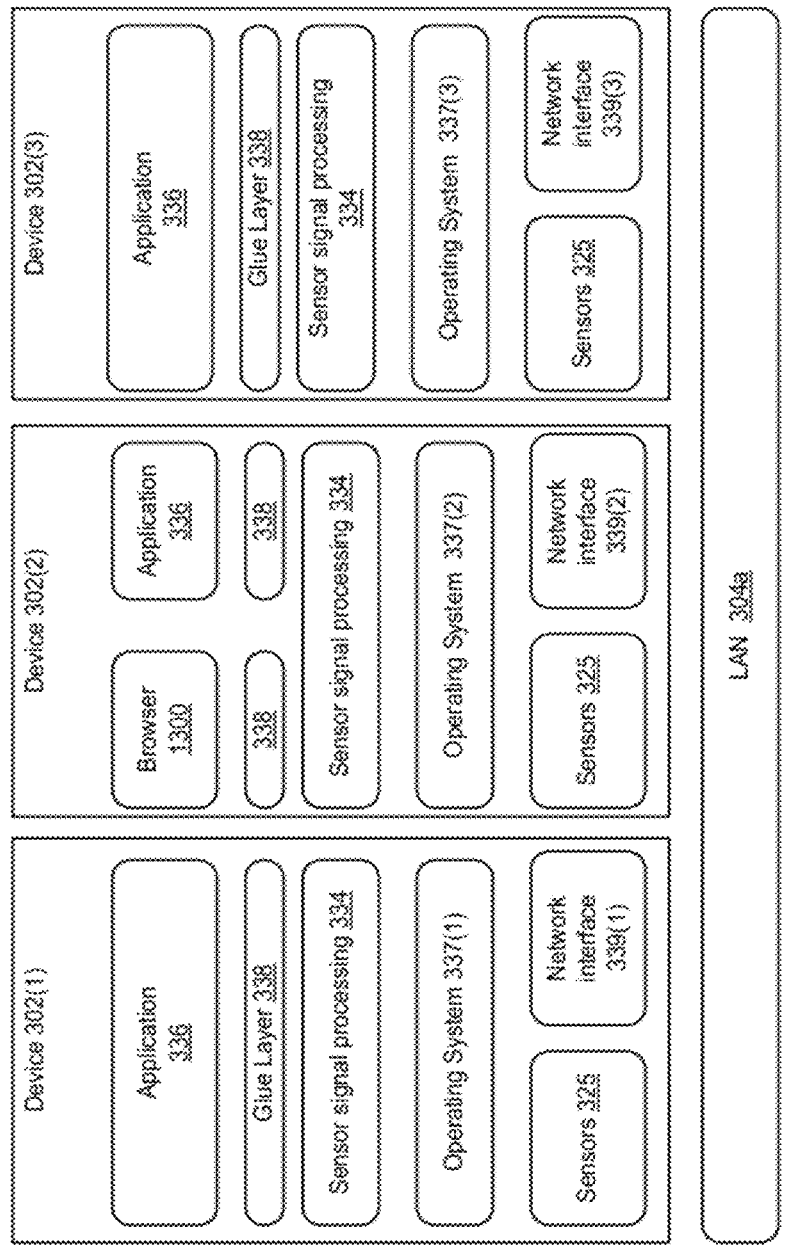
FIG. 3B is a diagram of components on several different devices showing further details of FIG. 3A.

FIG. 3B is a diagram of components on several different devices 302(1)-302(3) showing further details of FIG. 3A. One point to note is that each of the devices 302 may be running a different operating system 337(1)-337(3), may have different network interfaces 339(1)-339(3), as well as other differences. The sensor signal processing 334 may allow applications 366 on each of the devices 302 to easily utilize the sensor data from other devices without the need to deal with details of differences in how the sensor data is formatted. Also, the applications 366 do not need to deal with differences in clocks between the devices. As far as a given application 366 is concerned, the sensor data (or signal derived therefrom) may be time synchronized to the local clock for that device.

In FIG. 3B, the code in the sensor signal processing 334 collects sensor data from the sensors 325 at that device. For example, code in the sensor signal processing 334 for device 302(1) collects the sensor data from one or more sensors 325 at device 302(1). This data may be stored in any convenient format. As one example, the sensor signal processing 334 stores the sensor data in a C++ structure, although another format could be used. The sensor signal processing 334 may also process the sensor data to create a certain type of signal, such as a skeletal signal. In this embodiment, the sensor signal processing code 334 resides between the operating system 337 and the applications 336.

Figure 13:
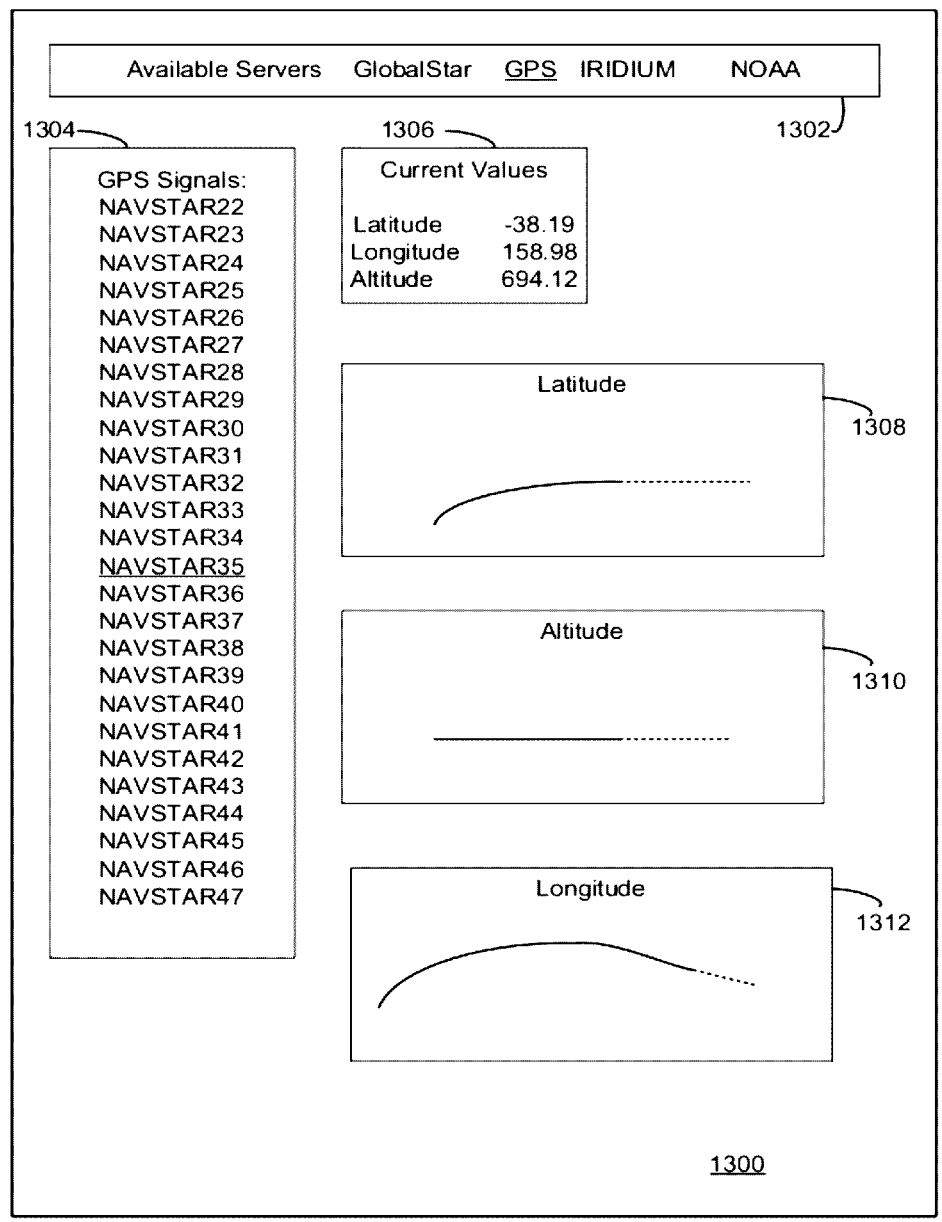
FIG. 13 depicts one embodiment of a browser.

The sensor signal may be provided over the LAN 304a to another device (e.g., 302(2)) that subscribes to the sensor signal. The sensor signal processing 334 at the subscribing device may process the sensor signal and provide it to the application 336. The glue layer 338 may include shared memory interfaces, network sockets, or compiled libraries, which may be linked into an application 336 (e.g., engine or diagnostic application). Therefore, application developers may focus on work inside the engines and not worry about the topology of the network 304, or how to read individual sensors 325. The sensor data may simply show up at the application 336 in a hierarchy of available data feeds, already time-shifted to the local clock. In this example, one of the devices 302(2) has a browser 1300, which may be used to view what sensor signals are available from other devices 302, subscribe to sensor signals, view sensor signals, etc. An example interface for a browser is depicted in FIG. 13.

Figure 3C:
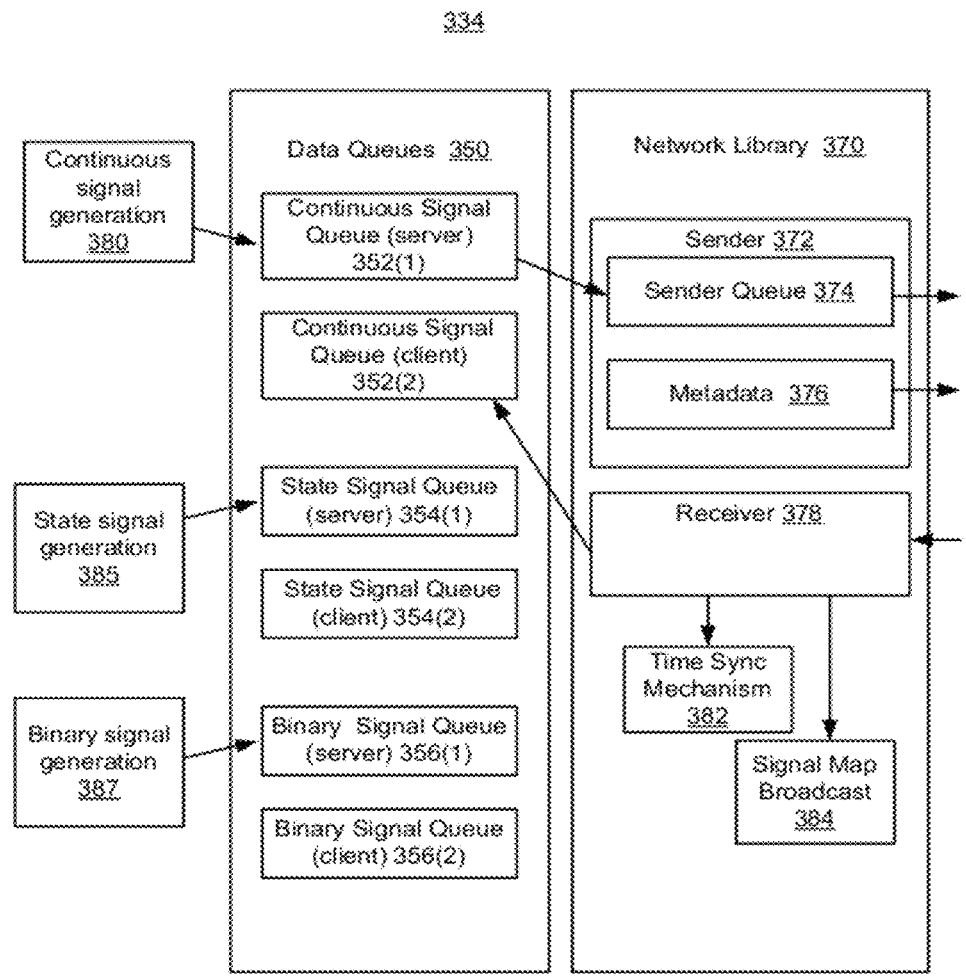
FIG. 3C is a block diagram of one embodiment of sensor signal processing code.

FIG. 3C is a block diagram of one embodiment of sensor signal processing 334. In general, the components include continuous signal generation 380, state signal generation 385, binary signal generation 387, data queues 350, and a network library 370. The various components may be implemented in software and/or hardware on the device 302.

The data queues 350 store data for outgoing and incoming sensor signals. In this example, there is an outgoing (server) and an incoming (client) queue depicted for each of three different types of signals. In this example, there are continuous signal queues 352(1), 352(2), state signal queues 354(1)-254(2), and binary signal queues 356(1)-356(2). The signal types correspond to those depicted in FIG. 2. There may be any number of queues 356. The data queues 350 may also be referred to herein as buffers.

The device 302 has continuous signal generation logic 380 that generates a continuous signal. As one example, the logic 380 might generate skeletal signals. Thus, the continuous signal generation logic 380 might receive sensor data such as depth information and/or RGB data for use in determining the skeletal signal. As another example, the continuous signal generation logic 380 might receive raw GPS data from a GPS sensor. This data might be processed to form a GPS signal. However, the raw data could be supplied in the signal.

The network library 370 handles the transmission between the data queues 350 and the network 304. The network library 370 includes a sender 372, a receiver 378, a time synchronization mechanism 382, and a signal map broadcast 384. The sender 372 has a sender queue 374, which holds the signals for transmission to other devices 302 on the network 304. The sender 372 also has metadata 376, which describes the sensor signals. The metadata may be sent once prior to sending the actual sensor signals.

The time synchronization mechanism 382 is able to time synchronize with other devices 302 on the network. There are various ways to time synchronize with other devices 302. One technique is to communicate with other devices 302 to determine a "skew" or "offset" between the local clock and the other device's clock. Another technique is to access a global clock, which other devices 302 also access. Note that use of a global clock is not a requirement.

The receiver 378 receives sensor signals and metadata from the network 304. The sensor signals may have time stamps in them to indicate the time at which the sensor data was collected at the publishing device. Note that these time samples may be from the perspective of the publishing device. The receiver 378 may access the time synchronization mechanism 382 to convert these time samples to the local clock. The receiver 378 may then add data from the sensor signal to the appropriate data queue.

The signal broadcast map 384 is used to broadcast the sensor signals that the device makes available to other devices 302. It also may keep track of subscribing devices 320. The signal broadcast map 384 may also access the network 304 to determine what sensor signals other devices 302 are (or will) make available. The signal broadcast map 384 may keep track of which sensor signals the device 302 has subscribed to.

FIGS. 4A-4C depict further details of embodiments of data queues 350 of FIG. 3C. FIG. 4A is a diagram of one embodiment of a queue (or buffer) for a continuous signal 352. The queue includes a number of data samples and a time stamp associated with each data sample. If this is an incoming (client) queue, then the time stamp may have been converted to the local clock. If this is an outgoing (server) queue, then the time stamp may be the time at which the data was collected in reference to the server's clock.

An example of a data sample is a collection data that represents skeletal data, using the example of a skeletal signal. For example, one way to represent skeletal data is in terms of joints that connect bones. A position (e.g., x,y,z) might be specified for each joint. Skeletal data can be specified in other ways. As previously noted, the publishing device may send metadata that describes the sensor signal. This metadata might specify the length of each sample, a description of various fields in the sample, the format of the data (e.g., integer, floating point, etc.). Therefore, the subscribing device 302 may access the metadata to determine how to interpret the various fields.

Note that in some embodiments, the subscribing device 302 may be able to predict future values for the continuous signal. For example, based on samples 1 to n (representing times 1 to n), the subscribing device 302 might predict values for data sample n+1 (representing time n+1). Also note that the subscribing device may want to work with data that does not correspond to the specific times of the data samples. The subscribing device could interpolate to generate data for a time that corresponds to halfway between time sample 1 and time sample 2, as one example.

FIG. 4B is a diagram depicting one embodiment of a data queue for a state signal 354. The queue includes a number of commands and a time stamp associated with each command. If this is an incoming (client) queue, then the time stamp may have been converted to the local clock. If this is an outgoing (server) queue, then the time stamp may be the time at which the data was collected in reference to the server's clock.

FIG. 4C is a diagram depicting one embodiment of a data queue for a binary signal 356. The queue includes a number of frames of binary data and a time stamp associated with each frame. If this is an incoming (client) queue, then the time stamp may have been converted to the local clock. If this is an outgoing (server) queue, then the time stamp may be a time associated with the frame in reference to the server's clock. In some embodiments, multiple data packets may be transmitted (and received) for each frame. Further details are discussed below.

FIG. 5A is a diagram depicting one embodiment of a data structure 303 that lists sensors signals that a device 302 publishes and subscribers to each sensor signal. Such a structure may be built and maintained at a publishing device 302. In this example, the device 302 publishes signal x, signal y, and signal z. Each sensor signal could be one of the types of signals depicted in FIG. 2. When publishing that a sensor signal is available, the device 302 may include information that describes its signal type. For example, the publication may indicate that it is a continuous signal, a skeletal signal, and a head only signal. When a device 302 subscribes to the sensor signal it may be added to the list of subscribing devices in the table. The table may contain any information that may be used to send the sensor signal to the subscribing device, such as an IP address.

FIG. 5B is a diagram depicting one embodiment of a data structure 307 that lists sensor signals to which a device 302 has subscribed and the publishing device 302. Such a data structure may be built and maintained by the sensor signal processing layer 334 of a subscribing device 302. In this example, the device 302 subscribes to signal A, signal B, and signal C. Each sensor signal could be one of the types of sensor signals depicted in FIG. 2. When a device 302 subscribes to a sensor signal, it may add an identifier of the sensor signal and the publishing device to the list. For example, the device has subscribed to signal A, which is published by device A; signal B, which is published by device B; and signal C, which is published by device C. The table may contain any information that may be used to contact the publishing device, such as an IP address.

In one embodiment, a network server 310 operates as a central clearing-house for sensor signals and subscriptions thereto. For example, referring to FIG. 1B, the network server 310 has a signal directory 312 and subscriber lists 314. FIG. 5C is a diagram depicting one embodiment of a data structure that stores the signal directory 312 and the subscriber lists 314. In this example, the signal directory 312 includes signal A, signal B, Signal C and signal D. Each signal could be one of the types of signals depicted in FIG. 2. Publishing devices may send a communication to the network server 310 identifying the sensor signals they are willing to publish. Thus, the publisher of each sensor signal may be listed in the signal directory 312. Devices 302 may be able to access the network server 310 to browse the signal directory 312 to determine to which sensor signals they wish to subscribe. The signal directory 312 could have a hierarchical format, such as depicted in FIG. 2, to assist in browsing the sensor signal list. When a device 302 subscribes to a sensor signal, the network sever 310 may add an identifier of the device to the device list for that signal. For example, for signal A, there is a device list in the subscriber column of FIG. 5C.

Figure 6A:
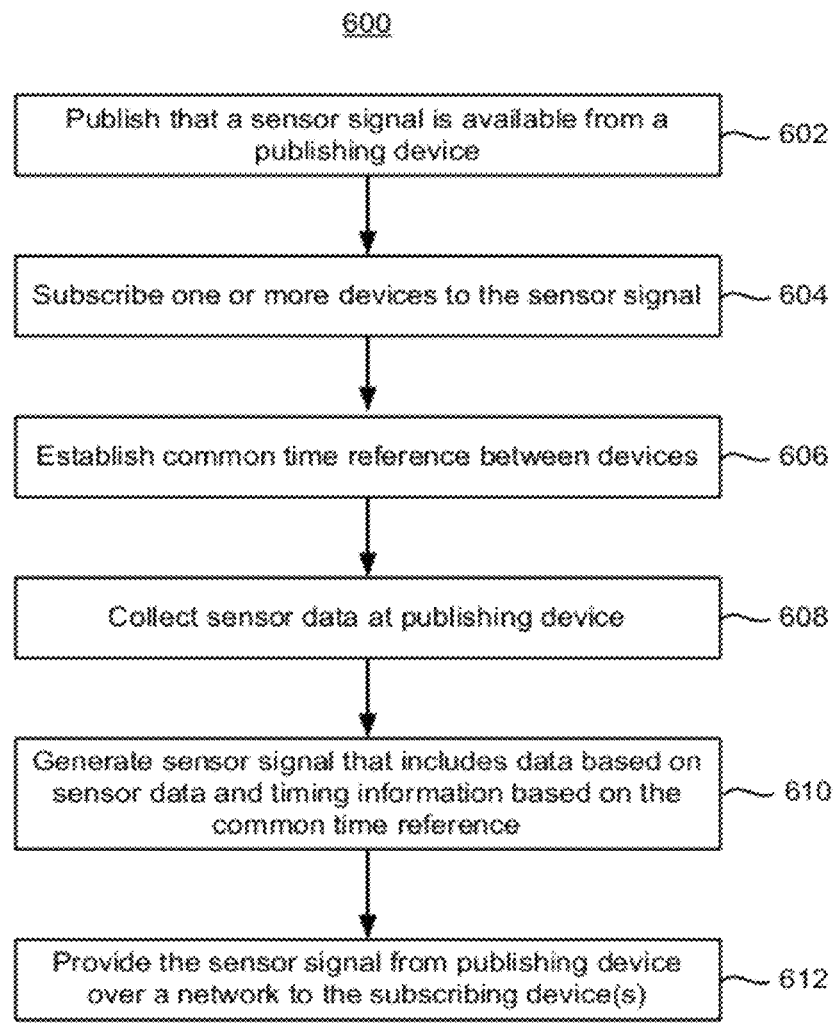
FIG. 6A is a flowchart of one embodiment of a process of a device publishing availability of a sensor signal and providing the sensor signals to subscribing devices.

FIG. 6A is a flowchart of one embodiment of a process 600 of a device 302 publishing availability of a sensor signal and providing the sensor signals to subscribing devices. The process 600 could be performed by any of the devices 302 in FIG. 1A or 1B, for example. Typically, the publishing device 302 has access to some sort of sensor 325. The sensor signal(s) to be shared is derived from data collected from the sensor 325.

In step 602, the device 302 publishes an indication that it is willing to share a sensor signal. For example, referring to FIG. 2, the device 302 might publish that it is willing share skeletal signals. As another example, the device 302 might indicate that it is willing to share state signals (note that there may be a variety of types of state signals). Note that the signal processing code 334 at the other devices 302 may understand the hierarchy of FIG. 2, to facilitate signal subscription. However, note that using a hierarchy such as in FIG. 2 is not a requirement.

In one embodiment, the publishing device broadcasts information over a LAN 304a to inform other devices 302 on the LAN 304a that it is willing to share some type of signal. In one embodiment, the device sends a communication to a network server 310 to inform the server 310 that it is willing to share some type of signal. Note that both of these options might be used together. For example, a device (e.g., device 302a, FIG. 1B) with a sensor 324 might broadcast information over a LAN 304a to inform other devices (on the LAN (e.g., device 302b, FIG. 1B) that it is willing to share some type of sensor signal. Then, one of the other devices on the LAN 304a might send a communication to the network server 310 to inform the server 310 that there is a signal available to be shared.

In step 604, one or more devices 302 are subscribed to the sensor signal. This may include the publishing device receiving subscription requests from devices 302 that wish to subscribe to the signal(s). The subscribing device 302 might be connected to the publishing device through a LAN 304a. In this case, the subscribing device may send a message over the LAN 304a to the publishing device indicating its desire to subscribe to the signal(s). However, a LAN 304a connection is not required. Note that the subscribing device 302 does not need to have a connection with the publishing device 302. In one embodiment, the subscribing device 302 sends a communication to the network server 310 indicating its desire to subscribe to the signal(s). Further details of subscribing devices are described below. Note that part of subscribing a device 302 may include sending metadata that describes the signal to the subscribing device. In one embodiment, the publishing device 302 provides the metadata over a network 304 to the subscribing device 302. In one embodiment, the publishing device 302 provides the metadata to a network server 310, which provides the metadata to the subscribing device 302.

In step 606, a common time reference between the publishing and subscribing devices is established. In one embodiment, each device 302 accesses a global clock that is used by all devices 302. Thus, in one embodiment, the step of establishing a common time reference may be achieved by accessing a global clock. In one embodiment, each device 302 maintains its own clock. An offset may be computed between the clocks of two devices 302 by the two devices 302 exchanging time samples. Then, a device 302 may use the offset to convert another device's time to its own. Thus, in one embodiment, the step of establishing a common time reference, by a first device, may be achieved by receiving information from another device, and determining an offset to convert the other device's time to its own. Note that establishing a common time reference may be performed at a different stage in the process 600.

In step 608, the publishing device 302 collects sensor data. For example, a GPS sensor is used to collect longitude, and latitude data. As another example, a depth camera is used to collect depth information. As another example, the publishing device 302 monitors a user input device such as a game control, remote control, mouse device, etc.

In step 610, the sensor signal is generated by the publishing device 302. The sensor signal includes data that is based on the sensor 325. The sensor signal may also contain timing information. FIGS. 4A-4C show high-level examples of data queues that may store sensor signals.

In step 612, the sensor signal is provided to the subscribing device 302. As one example, the publishing device 302 provides the signal to the subscribing device over a network 304. This network may be a LAN 304a, but it could be a WAN 304b (e.g., Internet). As one example, the publishing device 302 provides the signal to a network server 310, which provides the signal to the subscribing device 302.

Figure 6B:
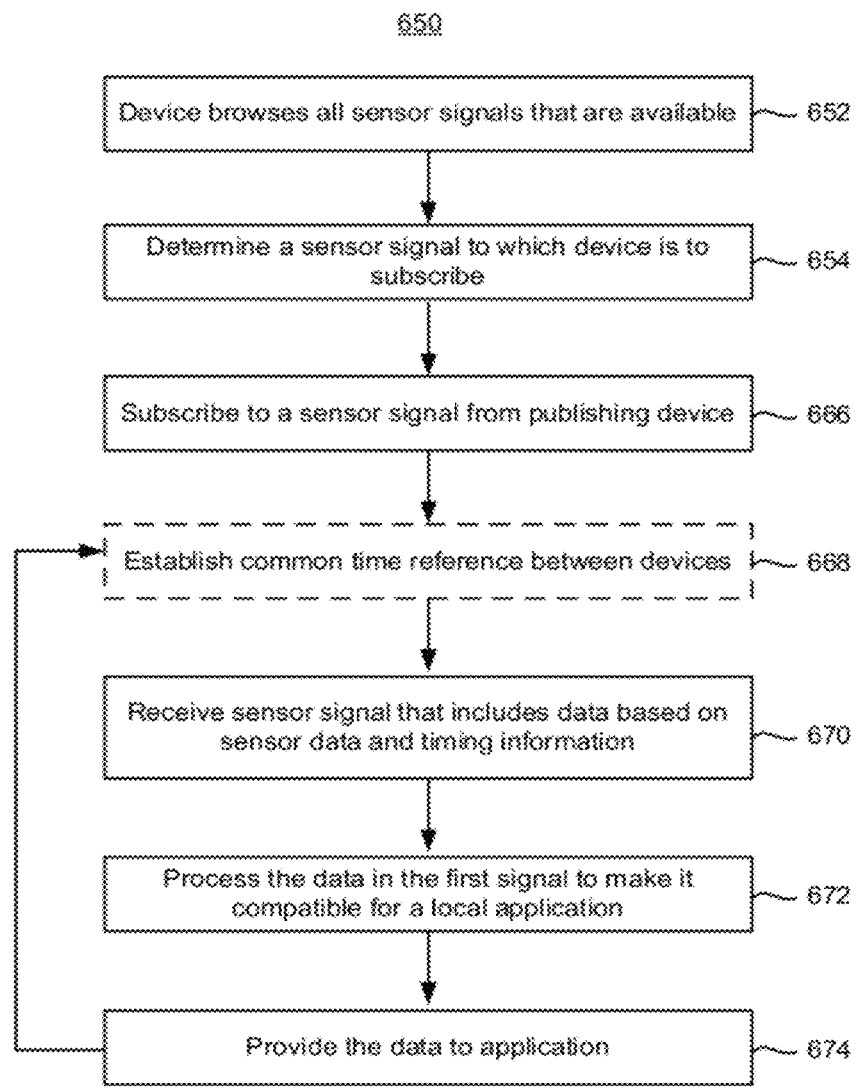
FIG. 6B is a flowchart of one embodiment of a process of a device determining what sensor signals it desires to subscribe to, receiving, and processing those sensor signals.

FIG. 6B is a flowchart of one embodiment of a process 650 of a device 302 determining what sensor signals it desires to subscribe to, receiving, and processing those sensor signals. Process 650 might be performed by any of the devices 302 in FIG. 1A or 1B, for example.

In step 652, a device 302 browses all sensor signals that are available. In one embodiment, this includes listening to broadcasts from publishing devices 302 over a network 304 (e.g., LAN 304a). In one embodiment, this includes the device 302 accessing a network server 310, where it may read the directory of signals that are available.

In step 654, a determination is made as to which sensor signal a device 302 wishes to subscribe. The determination might be made by a user selecting a sensor signal. For example, the user might select a sensor signal from a window in a browser. The determination might be made automatically by software on the subscribing device. For example, a software application might determine that it has a use for a skeletal signal.

In step 666, the subscribing device 302 requests to subscribe to the sensor signal. In one embodiment, the subscribing device 302 sends a request to the publishing device 302 over a network (e.g., LAN). In one embodiment, the subscribing device 302 sends the request to a network server 310.

In optional step 668, a common time reference is established between the subscribing device 302 and the publishing device 302.

In step 670, the subscribing device receives the sensor signal. As noted, this sensor signal may be based on sensor data that was collected at the publishing device. The sensor signal may also contain timing information.

In step 672, the data in the sensor signal is processed by the sensor signal processing code 334 to make it compatible for an application 336. The processing may include synchronizing the data to a local clock. The processing may include predicting future values for samples. The processing may include generating new samples, such that a continuous signal is at a frequency that is suitable for an application 336. For example, an application 336 may wish to operate with a different number of samples per second than the sensor signal has.

In one embodiment, step 672 includes extrapolating the data in the sensor signal to handle possible delays in signal transmission. Note the network bandwidth or latency may change over time. Therefore, the delays could vary over time. However, by extrapolating to cover for whatever the present delay is, the application may always obtain at least a prediction of data that is current.

In one embodiment, step 672 includes interpolating the data in the sensor signal. This may be used to handle possible differences in operating frequency of the application 336 and the frequency of samples in the sensor signal. For example, for a continuous signal, there might be 30 samples per second. However, the application might desire to work with 60 samples per second. By interpolating the data samples, the application 336 may be provided with 60 samples per second. Again, details of performing the interpolation need not be handled by the software application 336, but can be performed by software code at a lower level.

In step 674, the processed data is provided to a software application 336. Note that the software application 336 does not need to handle details of time synchronizing the data. Therefore, the software application 336 may simply use the data, along with other data it may have access to, without needing to time synchronize. The software application 336 might obtain data from sensors 325 from more than one other device 302, without needed to perform any time synchronization or other processing to make the data compatible for its needs. After step 674, the process 650 may return to step 668 to re-establish the common time reference between devices. Re-establishing the common time reference may be used to compensate for drift that may occur over time. Note that re-establishing the common time reference may occur at a much lower frequency than the data transmission rate. In other words, step 670 may receive many data samples prior to re-establishing the common time reference.

Figure 7A:
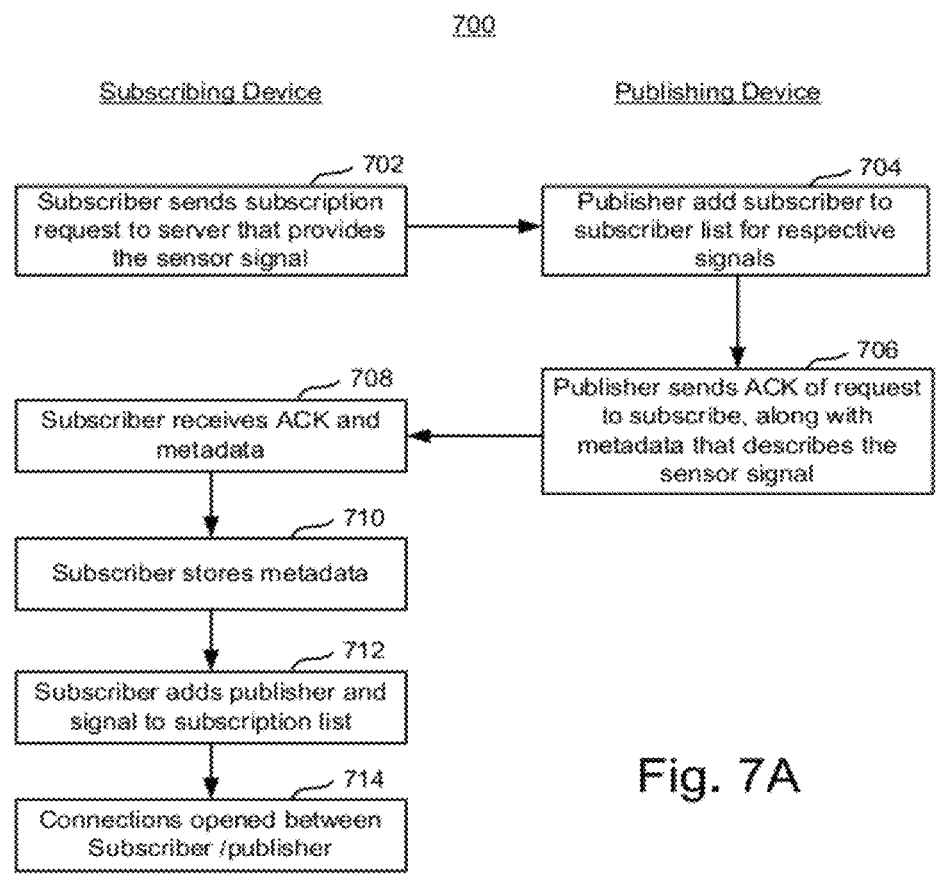
FIG. 7A is a flowchart of one embodiment of a process of a subscribing device subscribing to a sensor signal with a publishing device.

FIG. 7A is a flowchart of one embodiment of a process 700 of a subscribing device 302 subscribing to a sensor signal with a publishing device 302. The subscribing device 302 and the publishing device 302 may be connection through a LAN 304a. However, a network 304 other than a LAN 304a may be used. Prior to process 700, the subscribing device 302 has made a determination of a specific sensor signal to which is desires to subscribe. Process 700 describes steps that may be performed by the subscribing device 302 and steps that may be performed by the publishing device 302. The steps that may be performed by the publishing device 302 are one embodiment of step 604 of FIG. 6A. The steps that may be performed by the subscribing device are one embodiment of step 666 of FIG. 6B.

In step 702, the subscribing device 302 sends a subscription request message to a publishing device. In step 704, the publishing device 302 receives the subscription request message and adds the subscribing device 302 to its list of devices 302 that subscribe to this signal. Referring to FIG. 5A, "Device m" might be added to the list for "Signal x", as one example. In step 706, the publishing device sends an acknowledgment (ACK) to the subscribing device that it has been added to the subscription list, along with metadata that describes the signal. Table 1 below includes an example of metadata that might be used to describe a GPS signal. The metadata defines the type of data to be a "satellite signal" and a "continuous signal." Various fields are described, as well as that the data is of type "float."

TABLE 1

```
struct Satellite
{
    void DeclareType( )
    {
        Struct(Satellite, Continuous);
        Field(Latitude);
        Field(Longitude);
        Field(Altitude);
    }
    float Latitude;
    float Longitude;
    float Altitude;
};
```

In step 708, the subscribing device 302 receives the acknowledgment (ACK) and the metadata. In step 710, the subscribing device 302 stores the metadata. In step 712, the subscribing device 302 adds the publishing device and sensor signal to its subscription list. Referring to FIG. 5B, "Signal A" and "Device A" might be added to the subscription list.

In step 714, a communication connection may be opened between the subscribing device 302 and the publishing device 302 for the purpose of providing the sensor signal from the publishing device to the subscribing device.

Figure 7B:
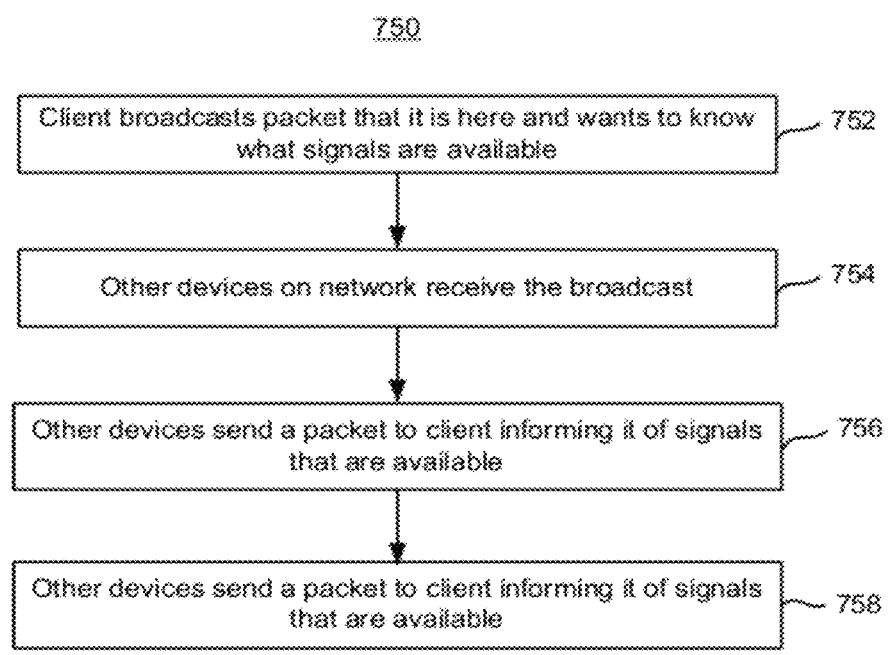
FIG. 7B is a flowchart of one embodiment of a process of a device learning of what sensor signals are available if it misses one or more broadcasts.

One technique for a device 302 to learn of the sensor signals that are available is to listen for broadcasts on a network 304 (e.g., LAN 304a). However, in some cases, the device may miss a broadcast. For example, devices 302 might come and go from the network 304 at any time. FIG. 7B is a flowchart of one embodiment of a process 750 of a device 302 learning of what sensor signals are available if it misses one or more broadcasts. Process 750 is one embodiment of step 652 of FIG. 6B.

In step 752, the device 302 broadcasts a packet on the network 304 indicating that it wants to learn what sensor signals the other devices 302 have available. Instead of a broadcast, the device could send a message directly to the other device(s). In step 754, the other devices 302 on the network 304 receive the broadcast.

In step 756, the other devices send a message to the device indicating what sensor signals they publish. In one embodiment, the other devices 302 each broadcast a message on the network for any device 302 on the network to receive. In step 758, the device receives the messages (or broadcasts).

Figure 7C:
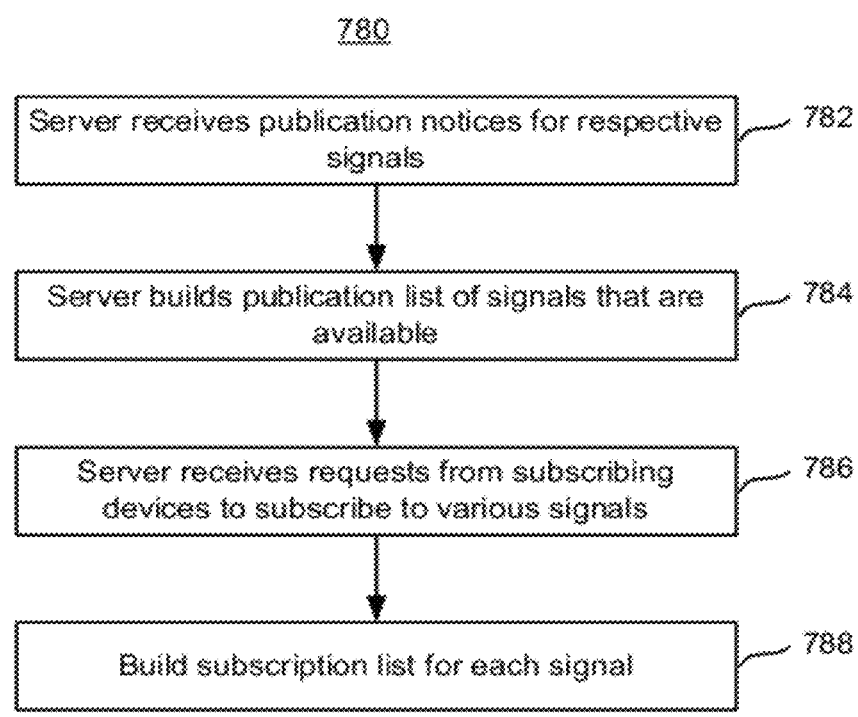
FIG. 7C is a flowchart of one embodiment of a process of a network server setting up a directory of available sensor signals and building subscriber lists.

As noted above, in one embodiment, there is a network server 310 that may serve as clearinghouse for the sensor signals. FIG. 7C is a flowchart of one embodiment of a process 780 of a network server 310 setting up a directory of available sensor signals and building subscriber lists. Process 780 may be used to build a table such as the one in FIG. 5C. In step 782, the network server 310 receives publication notices from publishing devices. In step 784, the network server 310 builds a list of signals that are available. In step 786, the network server 310 receives requests from devices 302 to subscribe to various signals. In step 788, the network server 310 adds the subscribing devices 302 to the appropriate subscription list.

Figure 8A:
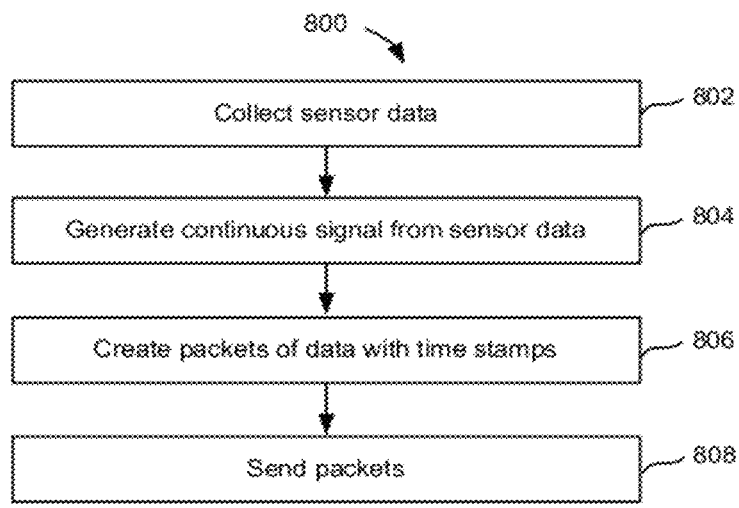
FIG. 8A is a flowchart of one embodiment of a process of generating a continuous signal.
Figure 8B:
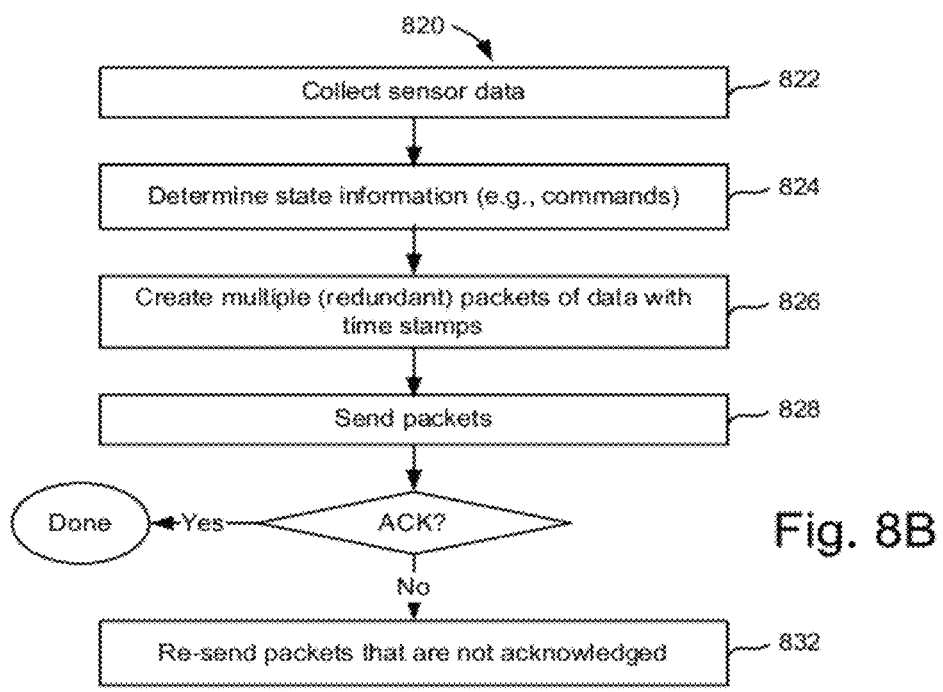
FIG. 8B is a flowchart of one embodiment of a process of generating a state signal.
Figure 8C:
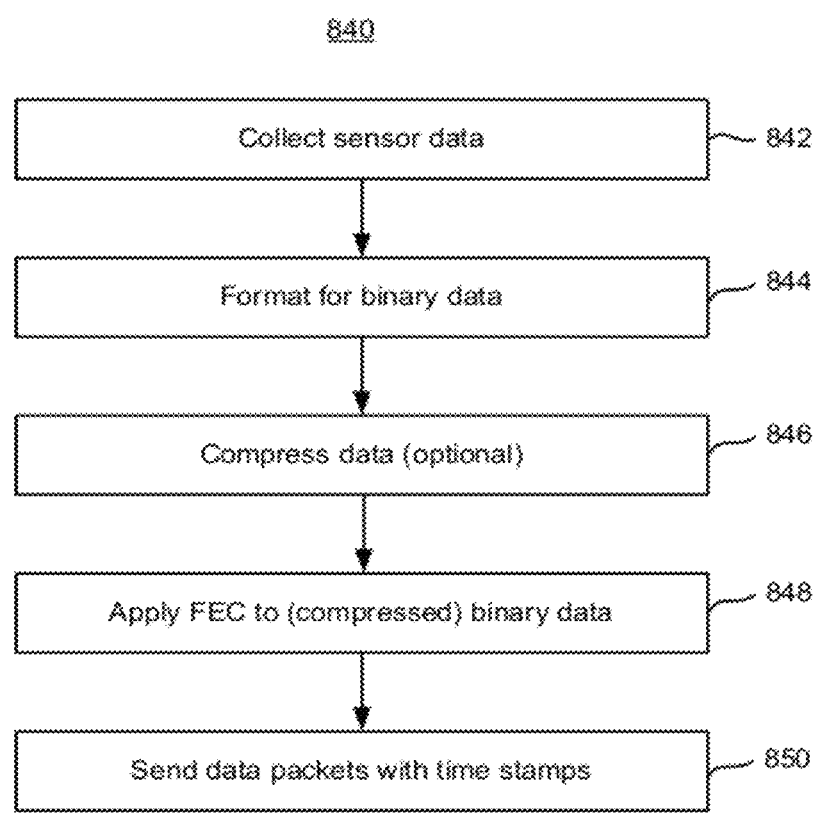
FIG. 8C is a flowchart of one embodiment of a process of generating a binary signal.

FIGS. 8A-8C provide additional details for embodiments of the publishing device 302 generating a sensor signal based on sensor data. FIG. 8A is a flowchart of one embodiment of a process 800 of generating a continuous signal. Process 800 is one embodiment of steps 608-612 of FIG. 6A. In step 802, sensor data is collected. As one example, this might be collected data from a GPS sensor. As another example, this might be collecting data from a depth image sensor. An example of a device with a depth image sensor is described below. Step 802 is one embodiment of step 608.

In step 804, a sensor signal is generated based on the sensor data. As one example, a skeletal signal may be generated based on the sensor data. This sensor signal may include data samples. Each data sample may be associated with a particular point in time. Step 804 is one embodiment of step 610.

In step 806, the sensor signal is packetized. As one example, a data packet contains a data sample and a time stamp for that data sample. A packet could include more than one data sample (and more than one time stamp). For some sensor signals a data sample might be spread out over two data packets. In step 808, the data packets are sent to the subscribing device. Steps 806-808 are one embodiment of step 612. In one embodiment, the data packets are sent by UDP.

FIG. 8B is a flowchart of one embodiment of a process 820 of generating a state signal. Process 820 is one embodiment of steps 608-612 of FIG. 6A. In step 822, sensor data is collected. As one example, this might include monitoring a user input device. The user input device may include, but is not limited to, a remote control, a game control, a keyboard, and a mouse. The sensor could also be used to determine voice commands or hand signals. Thus, a depth camera and/or a RGB camera might be used in step 822. Step 802 is one embodiment of step 608.

In step 824, state information is determined based on the sensor data. As one example, commands are determined based on the sensor data. For example, a user might pull a trigger on a "gun" that is used in a video game. In this case, the state information may be whether or not the trigger is pulled. Another way to view this, is that the act of the user pulling the trigger is a command to shoot the gun. Each piece of state information (e.g., each command) may be associated with a particular point in time. Step 824 is one embodiment of step 610.

In step 826, the state information is packetized. As one example, a data packet contains a piece of state information and a time stamp for that data sample. In other words, the data packet describes the state at that point in time. A packet could include more than one piece of state information (and more than one time stamp). In one embodiment, multiple packets are generated for a single piece of state information. In other words, redundant packets are generated. This may help to prevent loss of information in the event a packet is dropped. In step 828, the data packets are sent to the subscribing device 302. Steps 826-828 are one embodiment of step 612. In one embodiment, the data packets are sent by UDP.

In one embodiment, the publishing device 302 waits for an acknowledgement (ACK) that a given packet was received. If the ACK is not received, then the state information for that packet may be resent in step 832.

FIG. 8C is a flowchart of one embodiment of a process 840 of generating a binary signal. Process 840 is one embodiment of steps 608-612 of FIG. 6A. In step 842, sensor data is collected. As one example, this might be collected data from a GPS sensor. As another example, this might be collecting data from a depth sensor. An example of a device with a depth sensor is described below. Step 842 is one embodiment of step 608.

In step 844, the collected data is formatted into a binary signal. In optional step 846, the binary signal is compressed. In step 848, forward error correction (FEC) is applied to the binary signal (compressed or un-compressed, depending on whether compression was performed). Many different types of error correction may be used. The error correction may allow the subscribing device to reconstruct the entire binary signal even if one or more packets are dropped (or if there are other transmission errors). Steps 844-848 are one embodiment of step 610.

In step 850, the signal is packetized and sent to the subscribing device. As one example, a data packet contains a portion of the binary signal and a time stamp for that portion of the binary signal. Since this packet of information may correspond to a range of times, the time stamp could correspond to a specific point in the packet such as the beginning of the packet. Step 850 is one embodiment of step 612. In one embodiment, the data packets are sent by UDP.

FIG. 9A is a flowchart of one embodiment of a process 900 of processing a continuous signal. In process 900, data samples are added to a data queue (or buffer). For reference, a data queue such as the example of FIG. 4A may be constructed. Process 900 is one embodiment of processing the data in the signal (e.g., step 672 of FIG. 6B). In this case, the processing includes time synchronizing to a local clock. Process 900 may be performed by a subscribing device 302. In one embodiment, process 900 is performed at the synchronization layer 334. However, note that process 900 could be performed by the network server 310.

In step 902, a data sample in the continuous signal is accessed. In step 904, a time stamp in the continuous signal and that is associated with the data sample is accessed. As noted above, each packet of data might contain one data sample and one time stamp. However, other arraignments may be used.

In step 906, the time stamp is converted to local time. In one embodiment, the subscribing device 302 and publishing device 302 have previously exchanged information such that an offset or skew between their clocks may be determined. The subscribing device 302 may use this information to convert the time stamp to local time. In one embodiment, the subscribing device and the publishing device may each access a global clock. In such a case, the time stamp may correspond to this global time. In one embodiment, so that the applications 336 may conveniently use the data samples, the time stamps may be converted from the global time to local time.

In step 908, the data sample and the local time stamp are added to the queue (or buffer. The process 900 may then repeat by processing the next data sample in the continuous signal.

FIG. 9B is a flowchart of one embodiment of a process 920 of processing a state signal. In process 920, state information is added to a data queue (or buffer). For reference, a data queue such as the example of FIG. 4B may be constructed. Process 920 is one embodiment of processing a sensor signal (e.g., step 672 of FIG. 6B). In this case, time synchronizing of the data in the signal to a local clock is performed. Process 920 may be performed by the subscribing device. In one embodiment, process 920 is performed at the synchronization layer 704. However, note that process 920 could be performed by the network server 310.

In step 922, state information in the state signal is accessed. In step 924, a time stamp in the data signal and that is associated with the state information is accessed. As noted above, each packet of data might contain one piece of state information and one time stamp. However, other arraignments may be used.

In step 926, the time stamp is converted to local time. Step 926 may be similar to step 906 of FIG. 9A and will not be discussed in detail.

In step 928, the state information and the local time stamp are added to the queue (or buffer). The process 920 may then repeat by processing the next piece of state information in the state signal.

Figure 9C:
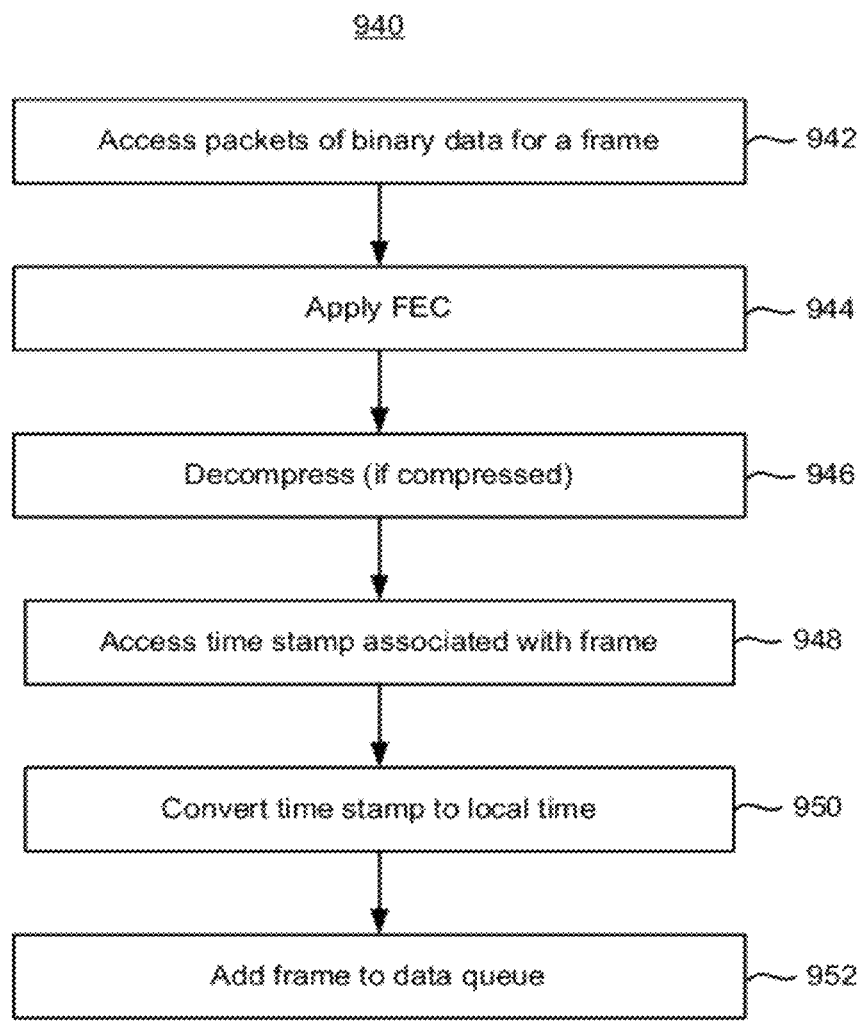
FIG. 9C is a flowchart of one embodiment of a process of processing a binary signal.

As noted above, one type of signal may be a binary signal. FIG. 9C is a flowchart of one embodiment of a process 940 of processing a binary signal. In process 940, frames of binary data are added to a data queue (or buffer). For reference, a data queue such as the example of FIG. 4C may be constructed. Process 940 is one embodiment of processing a sensor signal (e.g., step 672 of FIG. 6B). In this case, the processing includes time synchronizing the data in the signal to a local clock. Process 940 may be performed by the subscribing device. In one embodiment, process 920 is performed at the synchronization layer 334.

In step 942, packets of binary data that correspond to a frame of data are accessed. For example, a frame of data might be encoded in 12 data packets. In step 944, FEC is applied to correct any errors in the data transmission. In some embodiments, even of a data packet (or multiple data packets) are dropped, the binary signal may be fully decoded. In step 926, the packets of data are decompressed, if they were compressed when sent.

In step 948, a time stamp in the data signal that is associated with the frame is accessed. In step 950, the time stamp is converted to local time. Step 950 may be similar to step 906 of FIG. 9A and will not be discussed in detail.

In step 952, the frame and the local time stamp are added to the queue (or buffer). The process 940 may then repeat by processing the group of packets in the binary signal for the next frame.

Figure 10A:
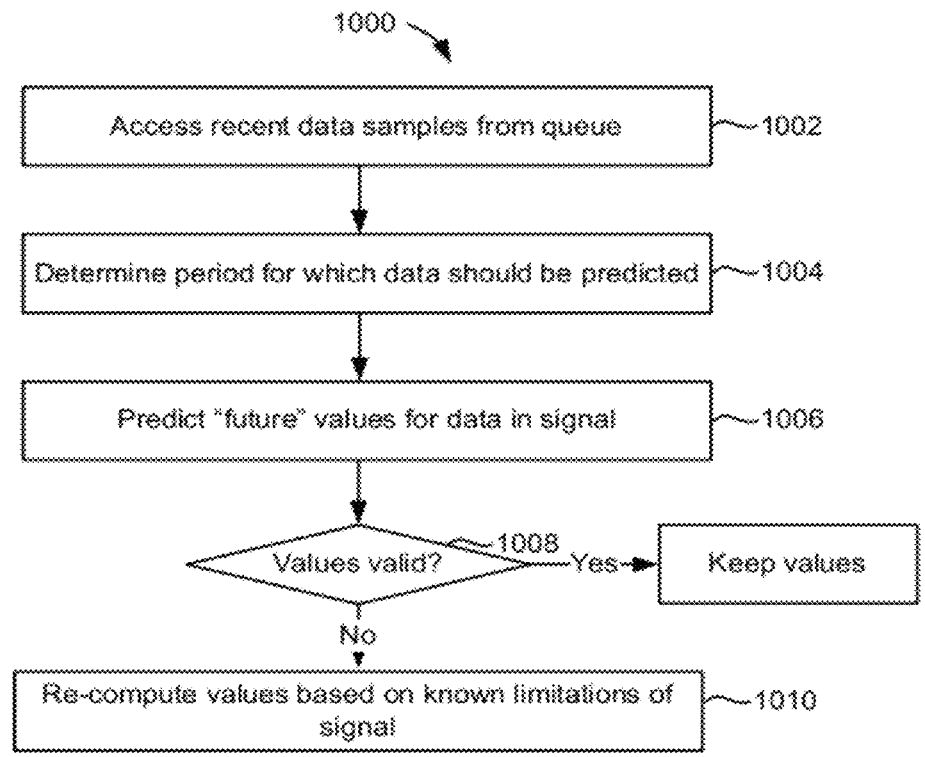
FIG. 10A is a flowchart of one embodiment of a process of predicting values for a continuous signal.

FIG. 10A is a flowchart of one embodiment of a process 1000 of predicting values for a continuous signal. Process 1000 is one embodiment of extrapolating a continuous signal. In process 1000, "future" values are predicted. By a future value it is meant that the value is for a time for which a data sample has not yet been processed at the subscribing device. Typically, this value may be used to fill in the gap between the actual present time and the actual time of the last sample. In other words, the predicted value may be used to compensate for delays, such as, network delays. Process 1000 is one embodiment of processing a sensor signal (e.g., step 672 of FIG. 6B). Process 1000 may be performed by the subscribing device. In one embodiment, process 1000 is performed at the synchronization layer 334 of a subscribing device 302. However, process 1000 may be performed by network server 310.

In step 1002, recent data samples from the queue for the continuous signal are accessed. Any number of recent data samples may be accessed. In step 1004, the period for which data should be predicted is determined. As one example, data for the period between the last data sample and the actual present time might be determined. However, data might be predicted for some time even beyond the present time. One possible use of this is to supply a rendering application with data "ahead of time," such that it might better match what is rendered to exactly what is occurring at that time.

In step 1006, one or more data samples are determined for this period of time. In one embodiment, the data samples in the queue are extrapolated to determine these values. Various extrapolation techniques may be used. For example, curve fitting might be used. The curve fitting might be first order, second order, third order, fourth order, etc.

In step 1008, a check is made to determine whether the values are valid. For example, for some a skeletal signal it may be known that a human elbow can only bend so far. If the extrication of step 1006 produced an invalid data sample, then new data samples may be determined that are compatible or in some way limited based on physical properties of the subject matter represented by the continuous signal, in step 1010. Note that the check and re-computation of steps 1008-1010 may be built into the extrapolation step 1006 such that invalid values are not generated in the first place.

Figure 10B:
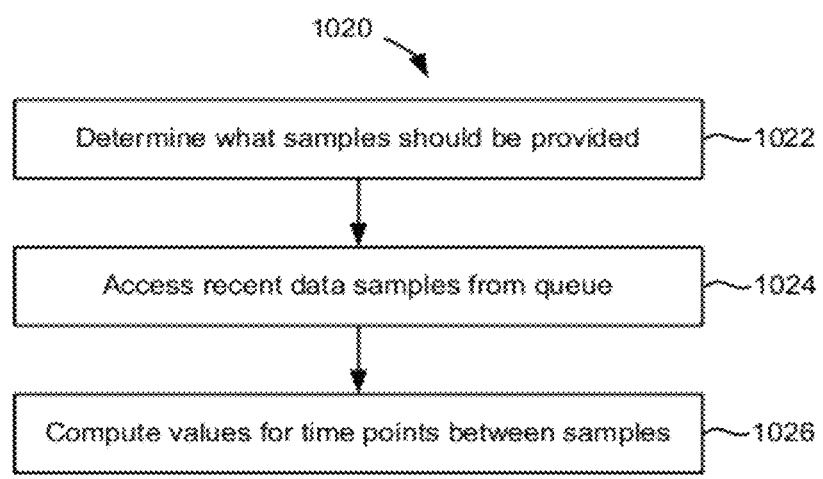
FIG. 10B is a flowchart of one embodiment of a process of generating additional sample values for a continuous signal.

FIG. 10B is a flowchart of one embodiment of a process 1020 of generating additional sample values for a continuous signal. Process 1020 is one embodiment of interpolating a continuous signal. In process 1020, values between data samples are determined. These values may be used to provide an application with data samples for time points other than the ones in the signal. For example, an application might want 60 samples per second, but the signal might only have 30 samples per second. Process 1020 may be used to provide the application with data samples at the frequency it desires. Process 1020 is one embodiment of processing data in the sensor signal (e.g., step 672 of FIG. 6B). Process 1020 may be performed by the subscribing device. In one embodiment, process 1020 is performed at the synchronization layer 334. Process 1020 could also be performed by the network server 310.

In step 1020, a determination is made of what data samples should be provided. This may be in response to a request from an application 336. Using the example above, an application 336 may specify a sampling frequency. For example, the application 336 may request that 60 samples per second be provided.

In step 1022, recent data samples from the queue for the continuous signal are accessed. Any number of recent data samples may be accessed. In step 1024, values for time points between samples in the signal are determined. In one embodiment, linear interpolation is used to interpolate between two or more samples. The values may then be provided to the application 336.

Figure 10C:
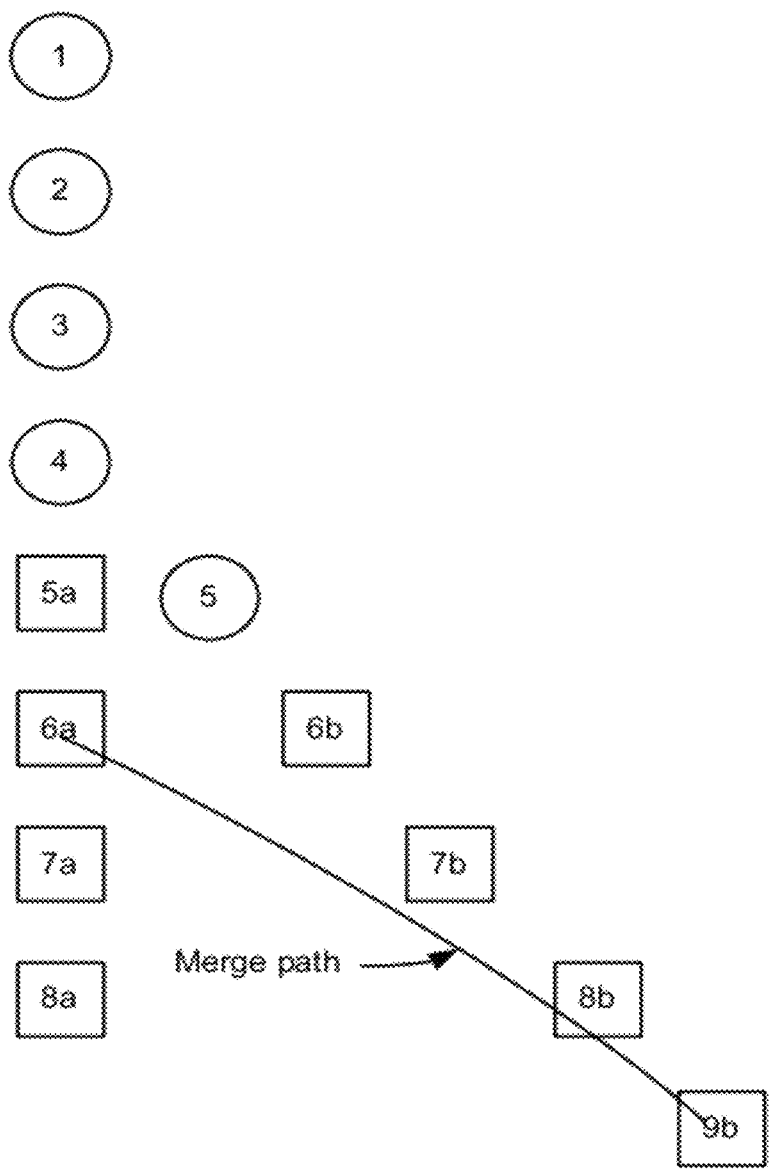
FIG. 10C depicts an example of correcting a previous prediction for a continuous signal.

In one embodiment, after sample values are predicted, the prediction is re-evaluated after actual sample values are later received. If it is determined that the prediction needs to be altered, a gradual change may be made such that there are not discontinuities. FIG. 10C provides as example that will be used to illustrate. The data samples might describe the position of a ball that has been thrown. The circles in FIG. 10C represent the position of the ball based on actual data samples for the ball. The boxes represent predictions of where the ball will go. The numbers in the circles represent the time of the sample (increasing numbers mean a later sample). If the only data samples are for times 1-4, it may be predicted that the path of the ball will continue to be straight, as indicated by boxes labeled 5a-8a. However, at time 5, the actual data sample in the signal reveals that the ball has been deflected. Therefore, a new set of predictions for the ball's path may be made, as represented by boxes 6b-9b.

However, there would be a large discontinuity if a correction was made by using, for example, boxes 7a, 8b, and 9b as the new path. Therefore, a gradual transition may be made from the first prediction (boxes 5a-8a) to the revised prediction (boxes 6b-9b). The new path may depend on what predicted values have already been provided to an application. For example, if predicted values for boxes 5a and 6a have already been provided to the application (but not box 7a or 8a), then a new path that gradually moves from box 6a to 9b might be calculated. An example, "merge path" is shown in FIG. 10C. Sample values may be generated for several points on the example merge path and provided to the application.

Figure 10D:
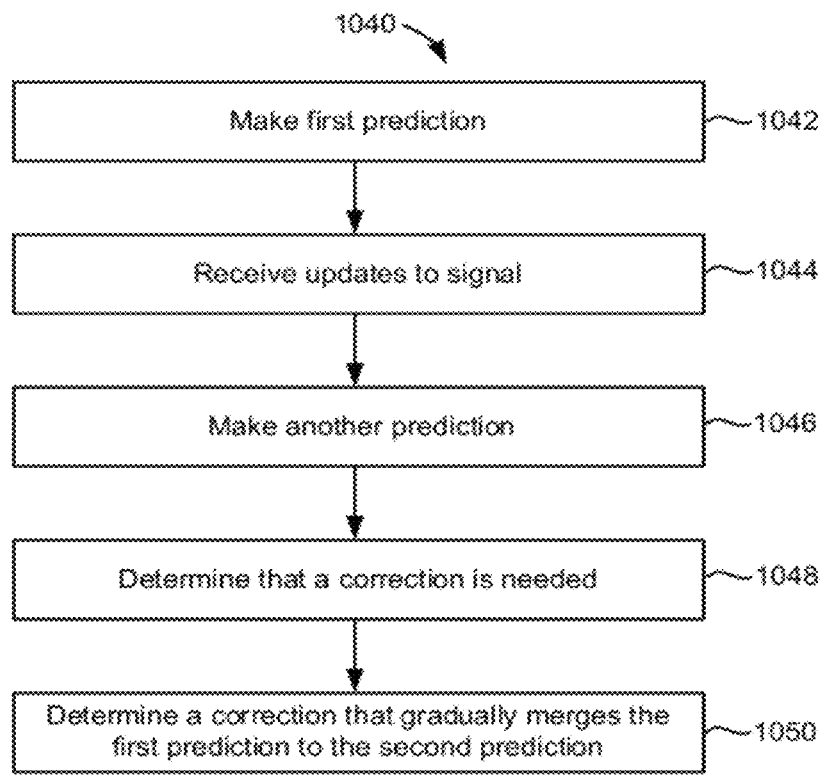
FIG. 10D is a flowchart of one embodiment of a process of gradually correcting predictions for a continuous signal.

FIG. 10D is a flowchart of one embodiment of a process 1040 of gradually correcting predictions. Process 1040 is one embodiment of processing the data in the signal (e.g., step 672 of FIG. 6B). Process 1040 may be performed by the subscribing device. In one embodiment, process 1040 is performed at the synchronization layer 704. Process 1040 may also be performed by the network server 310.

In step 1042, a first prediction is made for a first set of data samples. For example, process 1040 of FIG. 10A may be used to predict the path of the ball as represented by boxes 5a-8a, based on data samples for time periods T1-T4.

In step 1044, updates to the signal are received. For example, a data sample for time 5 is received. In step 1046, another prediction is made based on the new data sample. For example, the predictions represented by boxes 6b-9b of FIG. 10C are made. Note that it is not required that multiple data points be predicted, as in FIG. 10C.

In step 1048, it is determined that a correction is needed. This may be determined based on noting the difference between the predictions. Another technique is to compare an actual new data sample with a predicted value. For example, the actual data sample for the circle labeled "5" in FIG. 10C is compared with the box labeled "5a." Based on the difference between the prediction and the actual value, it may be determined that a new prediction may be warranted.

In step 1050, a correction that gradually merges the two predictions is made. Referring to FIG. 10C, one or more sample may be generated for points along the merge path.

Figure 10E:
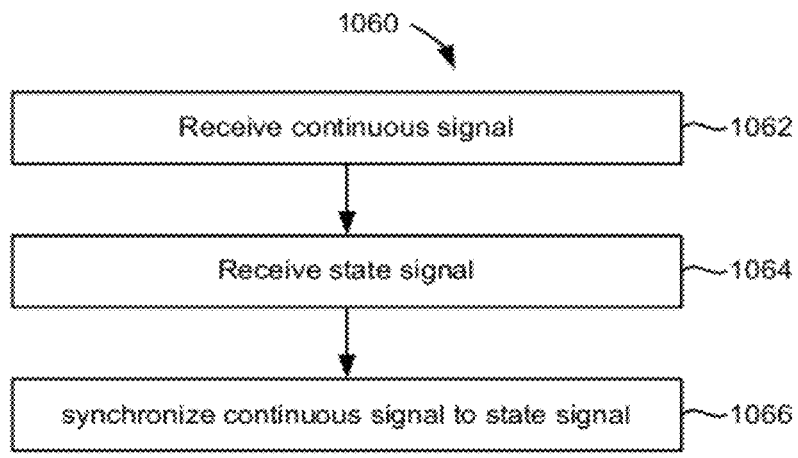
FIG. 10E is a flowchart of one embodiment of a process of time synchronizing two sensor signals.

In one embodiment, two or more signals are synchronized in time. For example, a continuous signal may be synchronized to a state signal. As one particular example, a skeletal signal (continuous signal) might be time synchronized to a gun trigger signal (state signal). FIG. 10E is a flowchart of one embodiment of a process 1060 of time synchronizing two signals. Process 1060 is one embodiment of processing the data in the sensor signal (e.g., step 672 of FIG. 6B). Process 1060 may be performed by the subscribing device. In one embodiment, process 1060 is performed at the synchronization layer 704. Process 1040 may be performed by the network server 310.

In step 1062, a continuous signal is received. Step 1062 may include adding data samples to a continuous signal queue 352, as described in FIG. 9A. For example, a skeletal signal is received. In step 1064, a state signal is received. For example, the signal describes the state of a trigger of a gun used in a video game. Step 1064 may include adding commands to a state information queue 354, as described in FIG. 9B.

In step 1066, the continuous signal and state signal are synchronized. Step 1066 may include comparing time stamps on the continuous signal queue 352 with the state information queue 354. As one example, first the time stamp for a given command is determined. Then, the continuous signal queue 352 is searched for that time stamp. Other techniques could be used. The results may be provided to an application 336.

Figure 11A:
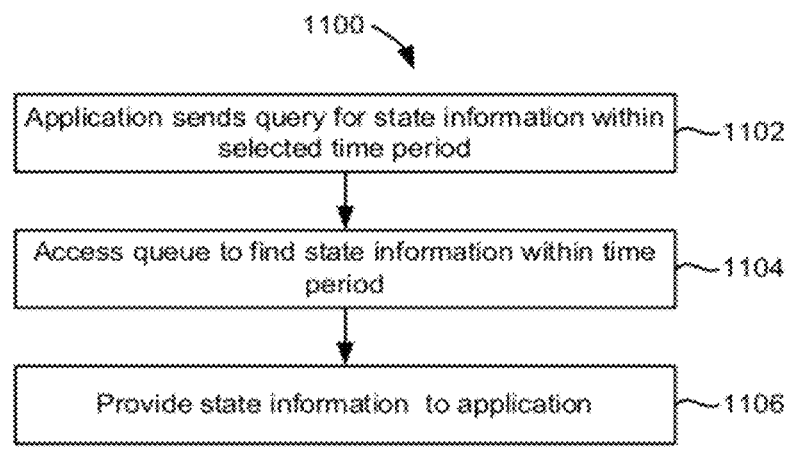
FIGS. 11A and 11B are embodiments of providing, to an application, data that has been processed and time synchronized.
Figure 11B:
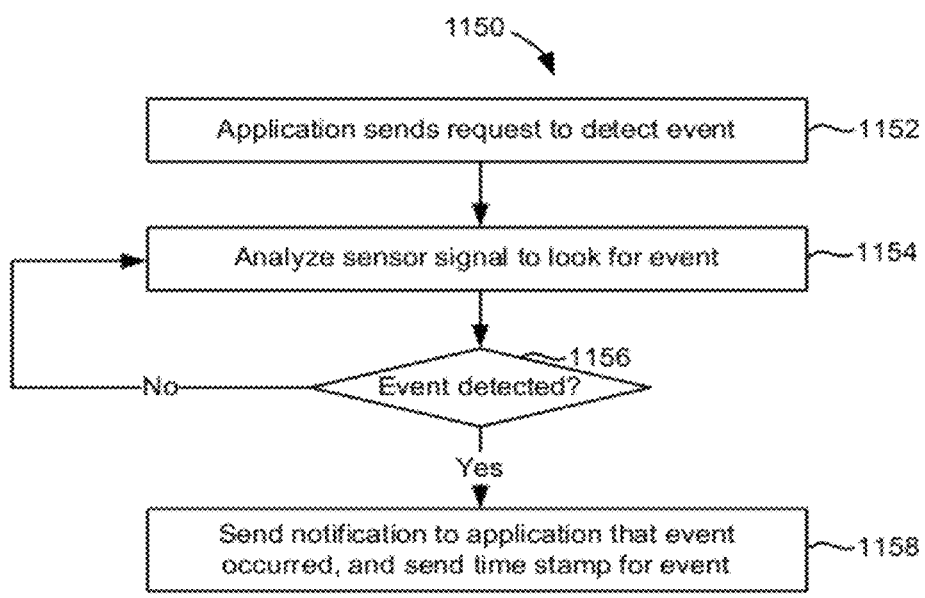

FIGS. 11A and 11B are embodiments of providing data that has been processed and time synchronized to an application 336. Process 1100 of FIG. 11A is one embodiment of providing processed sensor data to an application, and is one embodiment of step 674 of FIG. 6B. Process 1100 may be performed by the subscribing device 302. In one embodiment, process 1100 is performed at the synchronization layer 704. Process 1100 may be performed by the network server 310.

In step 1102, an application 336 sends a query to the synchronization layer 334 for state information with a selected time period. For example, an application 336 that renders data sends a request for all commands in a subscribed to state signal during a selected time period.

In step 1104, code at the synchronization layer 334 accesses a data queue for the state information to locate state information for the selected time period. In step 1106, the code at the synchronization layer 704 returns the state information to the application 336.

Process 1150 of FIG. 11B is one embodiment of providing processed and time synchronized the data to an application 336, and is one embodiment of step 674 of FIG. 6B. Process 1150 may be performed by the subscribing device 302. In one embodiment, process 1150 is performed at the synchronization layer 704. Process 1150 may be performed by the network server 310.

In step 1152, an application 336 sends a request that a certain event be monitored. For example, an application 336 sends a request that if the state of a gun trigger changes, that the application 336 be notified.

In step 1154, code at the synchronization layer 334 monitors for the event. For example, the code at the synchronization layer 334 monitors for a change in the state of the gun trigger signal. In one embodiment, the code accesses a data queue of the state information corresponding to the relevant state signal to monitor for the event.

Upon detecting the event, the code at the synchronization layer 334 notifies the application 336, in step 1158. The notification may include a local time stamp to indicate the time that the event occurred.

Figure 12A:
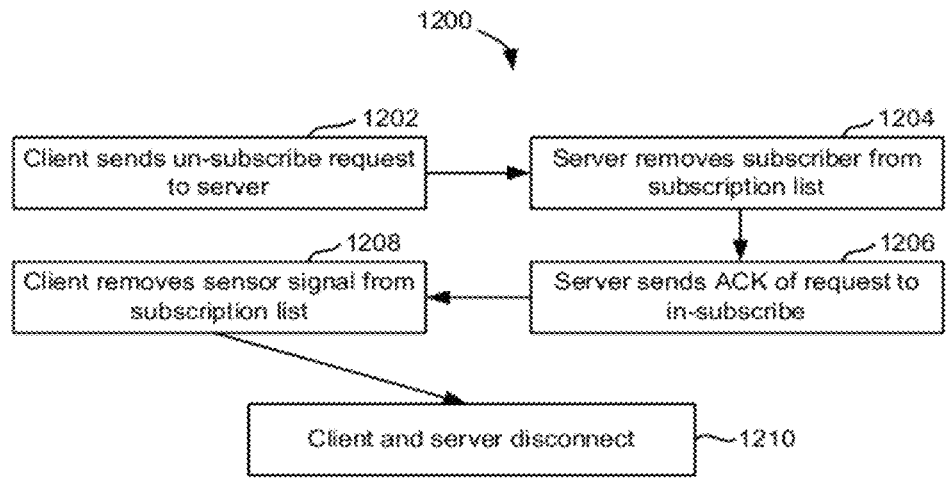
FIG. 12A is a flowchart of one embodiment of a process of a subscribing device gracefully leaving the network.

From time to time a device 302 may leave the network 304. FIG. 12A is a flowchart of one embodiment of a process 1200 of a subscribing device 304 gracefully leaving the network 304. In step 1202, the subscribing device 302 sends an unsubscribe message to the publishing device. In step 1204, the publishing device removes the subscribing device from its list of subscribing devices. In step 1206, the publishing device sends an acknowledgement (ACK) to the subscribing device. In step 1208, the subscribing device updates its list of signals to which it subscribes. For example, the sensor signal and publishing device are removed. In step 1210, connection between the subscribing device 302 and publishing device 302 is terminated. The process 1200 may be performed for all publishing devices to which the device subscribes.

Figure 12B:
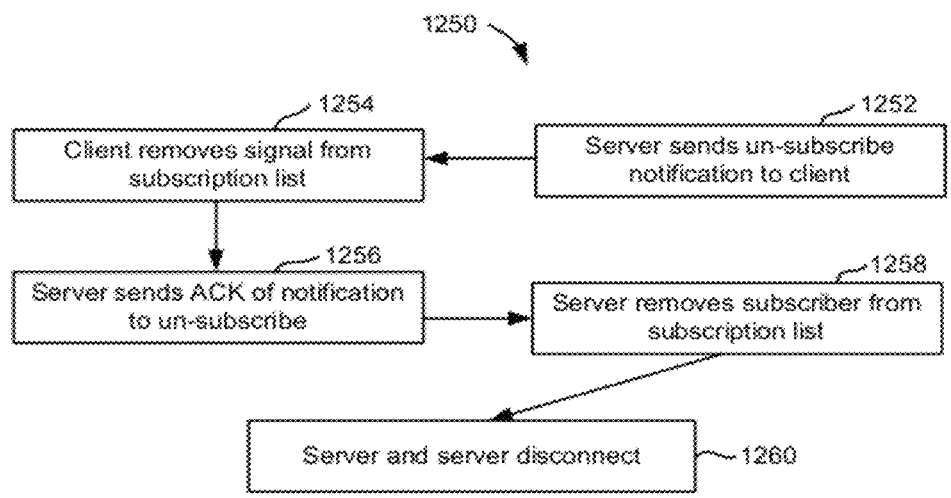
FIG. 12B is a flowchart of one embodiment of a process of a publishing device gracefully leaving the network.

FIG. 12B is a flowchart of one embodiment of a process 1250 of a publishing device 302 gracefully leaving the network 304. In step 1252, the publishing device 302 sends an unsubscribe message to the subscribing device 302. In step 1254, the subscribing device 302 removes the sensor signal to which it had subscribed device from its list of sensor signals. In step 1256, the subscribing device 302 sends an acknowledgement (ACK) to the publishing device 302. In step 1258, the publishing device 302 updates its list of devices 302 that subscribe to its sensor signals. In step 1260, connection between the subscribing device 302 and publishing device 302 is terminated. The process 1250 may be performed for all devices that subscribe to a sensor signal that is published by the device.

In one embodiment, a browser may be used to work with sensor signals. For example, the browser may discover all sensor signals in the network 304, enumerate and dynamically subscribe to the sensor signals. FIG. 13 depicts one embodiment of an interface for a browser 1300. The browser interface 1300 shows various types of sensor signals that are available in window 1302. In this case, the types of sensor signals include GlobalStar, GPS, IRIDIUM, and NOAA. Referring back to FIG. 2, these may each be different types of signal in the hierarchy. The type of signal "GPS" was shown in FIG. 2, but other could be listed. Presently, the sensor signal type of GPS has been selected. Therefore, in window 1304, the various GPS signals that are available are displayed. Currently, the NAVSTAR35 signal has been selected. The current values for the selected sensor signal are displayed in window 1306. Windows 1308, 1310, and 1312 show past values and predicted values for latitude, longitude, and altitude. The past values are represented by the solid portion of a line and the predicted by the dashed portion. Any technique, such as using different colors, might be used.

In some embodiments, the browser can also generate .h files defining the sensor signal structure, so that an application 336 can use the sensor signal even without knowing its type. This may be referred to as auto code generation. For auto code generation, the browser may use a type-safe data structure to store signal values in the client (subscribing) device. The browser may use its knowledge of data structures (through metadata from the publishing device) to decide if a target is compatible with a signal's content. This data structure may be provided by each device consuming the signal. As the browser has type-specific knowledge of the data structures behind a signal's content, it can be used to build the appropriate type-safe data structure code for direct import by the client. In one embodiment, auto-generated code includes a C++ header file for a known signal that can be compiled directly into the client.

Figure 14:
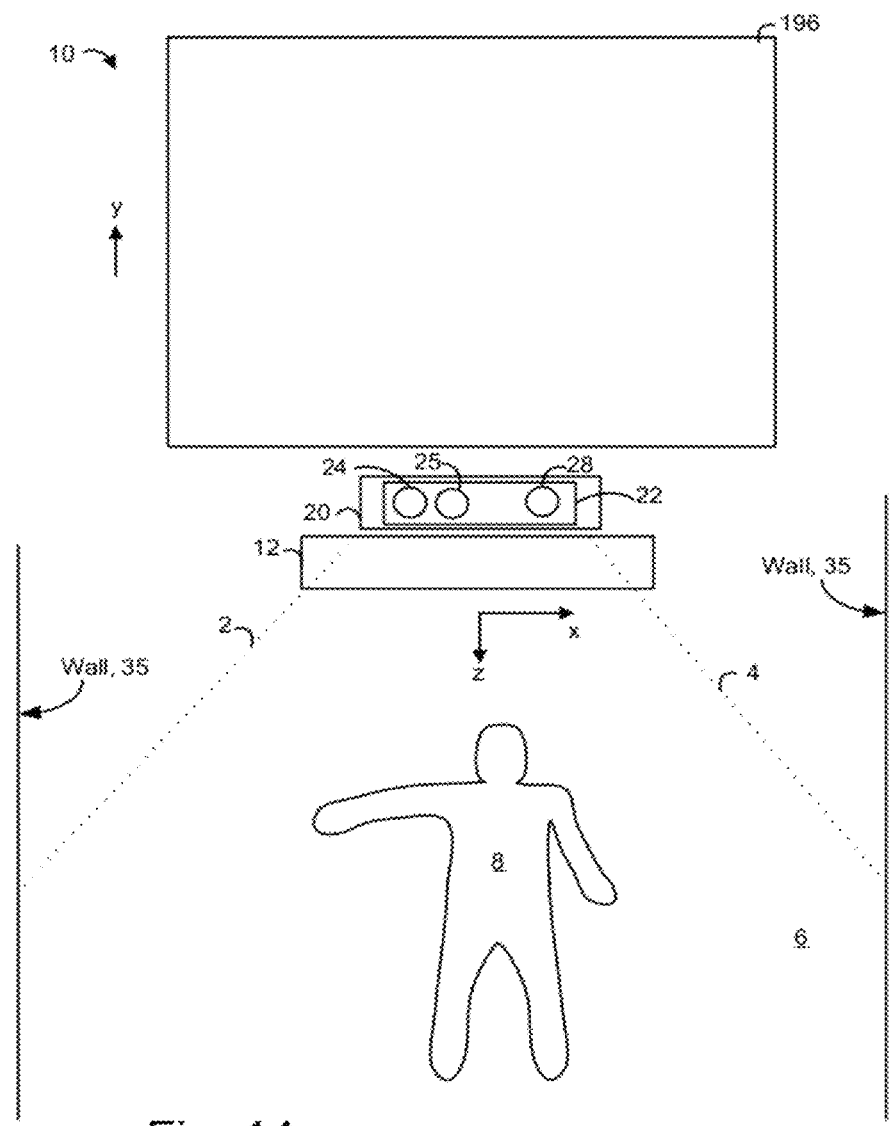
FIG. 14 depicts an example embodiment of a motion capture system that may be used as a publishing or subscribing device.

In some embodiments, one or more devices 302 that partake in time synchronization of signals between devices 302 include a motion capture system. Therefore, an example motion capture system will be described. However, it will be understood that technology described herein is not limited to a motion capture system. FIG. 14 depicts an example of a motion capture system 10 in which a person in a room (or other environment) interacts with an application. The motion capture system 10 includes a display 196, a depth camera system 20, and a computing environment or apparatus 12. The depth camera system 20 may include an image camera component 22 having a light transmitter 24, light sensor 25, and a red-green-blue (RGB) camera 28. In one embodiment, the light transmitter 24 emits a collimated light beam. Examples of collimated light include, but are not limited to, Infrared (IR) and laser. In one embodiment, the light transmitter 24 is an LED. Light that reflects off from the listener 8, objects 33, walls 35, etc. in the field of view 6 is detected by the light sensor 25. In some embodiments, the system 10 uses this information to determine how to generate a sensor signal.

A user, also referred to as a listener, stands in a field of view 6 of the depth camera system 20. Lines 2 and 4 denote a boundary of the field of view 6. A Cartesian world coordinate system may be defined which includes a z-axis, which extends along the focal length of the depth camera system 20, e.g., horizontally, a y-axis, which extends vertically, and an x-axis, which extends laterally and horizontally. Note that the perspective of the drawing is modified as a simplification, as the display 196 extends vertically in the y-axis direction and the z-axis extends out from the depth camera system 20, perpendicular to the y-axis and the x-axis, and parallel to a ground surface on which the user stands.

Generally, the motion capture system 10 is used to recognize, analyze, and/or track an object. The computing environment 12 can include a computer, a gaming system or console, or the like, as well as hardware components and/or software components to execute applications.

The depth camera system 20 may include a camera which is used to visually monitor one or more objects 8, such as the user, such that gestures and/or movements performed by the user may be captured, analyzed, and tracked to perform one or more controls or actions within an application, such as selecting a menu item in a user interface (UI).

The motion capture system 10 may be connected to an audiovisual device such as the display 196, e.g., a television, a monitor, a high-definition television (HDTV), or the like, or even a projection on a wall or other surface, that provides a visual and audio output to the user. An audio output can also be provided via a separate device. Note that the 3D audio signal is typically provided through the headphones 27. To drive the display, the computing environment 12 may include a video adapter such as a graphics card and/or an audio adapter such as a sound card that provides audiovisual signals associated with an application. The display 196 may be connected to the computing environment 12 via, for example, an S-Video cable, a coaxial cable, an HDMI cable, a DVI cable, a VGA cable, or the like.

Figure 15:
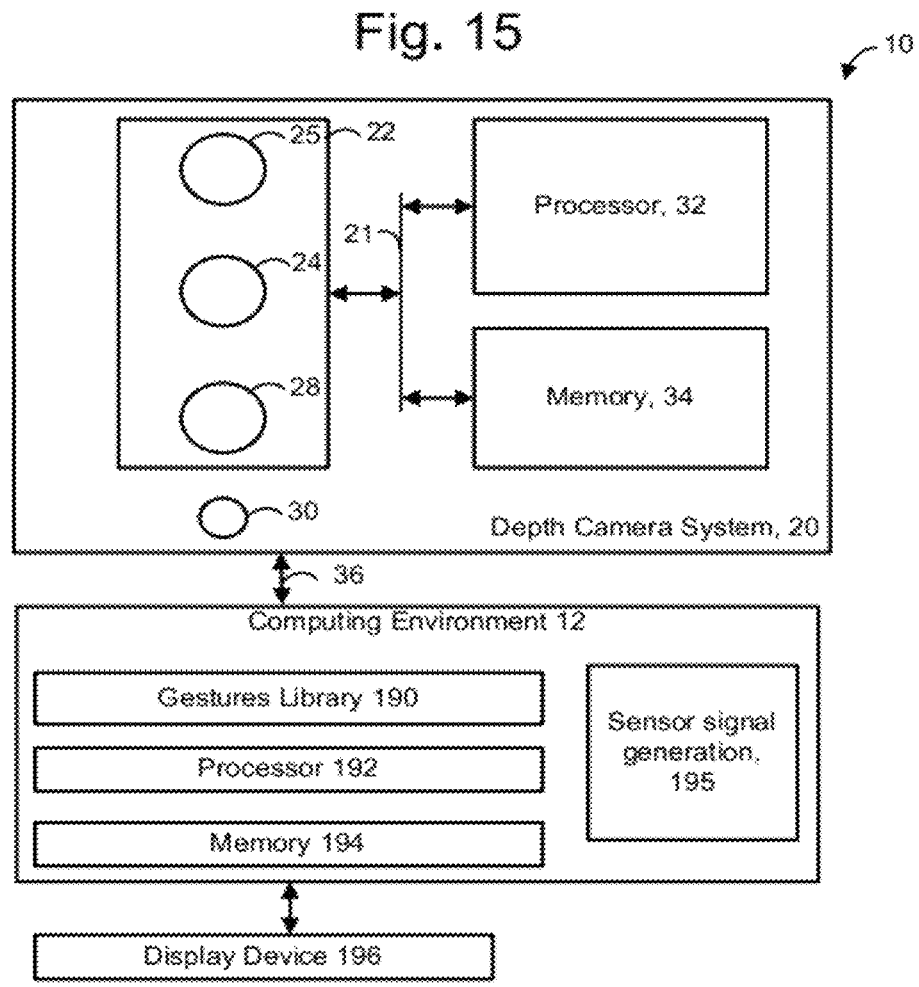
FIG. 15 depicts an example block diagram of the motion capture system of FIG. 1.

FIG. 15 depicts an example block diagram of the motion capture system 10 of FIG. 14. The system 10 includes a depth camera system 20 and a computing environment 12. In this embodiment, the computing environment 12 has sensor signal generation 195. The computing environment 12 inputs depth information and RGB information from the depth camera system 20 and may output a sensor signal. Note that hardware executed implementations, as well as mixed software/hardware implementations, are also possible.

The depth camera system 20 may be configured to generate a depth image that may include depth values. The depth camera system 20 may organize the depth image into "Z layers," or layers that may be perpendicular to a Z-axis extending from the depth camera system 20 along its line of sight. The depth image may include a two-dimensional (2-D) pixel area of the captured scene, where each pixel in the 2-D pixel area has an associated depth value which represents either a linear distance from the image camera component 22 (radial distance) or the Z component of the 3D location viewed by the pixel (perpendicular distance).

The image camera component 22 may include a light transmitter 24 and one or more light sensors 25 to capture intensity of light that reflect off from objects in the field of view. For example, depth camera system 20 may use the light transmitter 24 to emit light onto the physical space and use light sensor 25 to detect the reflected light from the surface of one or more objects in the physical space. In some embodiments, depth values are determined based on the intensity of light. For example, over time more and more photons reach a given pixel. After a collection period, the intensity of light at each pixel is sampled. The depth values in the depth image may be determined based on the intensity of light at each pixel. In some embodiments, the light transmitter 24 transmits pulsed infrared light. In some embodiments, the light is modulated at desired frequency.

The red-green-blue (RGB) camera 28 may be used to capture a visible light image. The depth camera system 20 may further include a microphone 30, which includes, e.g., a transducer or sensor that receives and converts sound waves into an electrical signal. Additionally, the microphone 30 may be used to receive audio signals such as sounds that are provided by a person to control an application that is run by the computing environment 12. The audio signals can include vocal sounds of the person such as spoken words, whistling, shouts and other utterances as well as non-vocal sounds such as clapping hands or stomping feet. In some embodiments, the microphone 30 is a microphone array, which may have any number of microphones running together.

The depth camera system 20 may include a processor 32 that is in communication with the image camera component 22. The processor 32 may include a standardized processor, a specialized processor, a microprocessor, or the like that may execute instructions including, for example, instructions for generating a sensor signal.

The depth camera system 20 may further include a memory component 34 that may store instructions that are executed by the processor 32, as well as storing images or frames of images captured by the RGB camera, or any other suitable information, images, or the like. According to an example embodiment, the memory component 34 may include random access memory (RAM), read only memory (ROM), cache, flash memory, a hard disk, or any other suitable tangible computer readable storage component. The memory component 34 may be a separate component in communication with the image capture component 22 and the processor 32 via a bus 21. According to another embodiment, the memory component 34 may be integrated into the processor 32 and/or the image capture component 22.

The depth camera system 20 may be in communication with the computing environment 12 via a communication link 36. The communication link 36 may be a wired and/or a wireless connection. According to one embodiment, the computing environment 12 may provide a clock signal to the depth camera system 20 via the communication link 36 that indicates when to capture image data from the physical space which is in the field of view of the depth camera system 20.

Additionally, the depth camera system 20 may provide the depth information and images captured by the RGB camera 28 to the computing environment 12 via the communication link 36. The computing environment 12 may then use the depth information, and captured images to control an application. For example, as shown in FIG. 15, the computing environment 12 may include a gestures library 190, such as a collection of gesture filters, each having information concerning a gesture that may be performed (as the user moves). For example, a gesture filter can be provided for various hand gestures, such as swiping or flinging of the hands. By comparing a detected motion to each filter, a specified gesture or movement that is performed by a person can be identified. An extent to which the movement is performed can also be determined.

The computing environment may also include a processor 192 for executing instructions, which are stored in a memory 194 to provide audio-video output signals to the display device 196 and to achieve other functionality.

Figure 16:
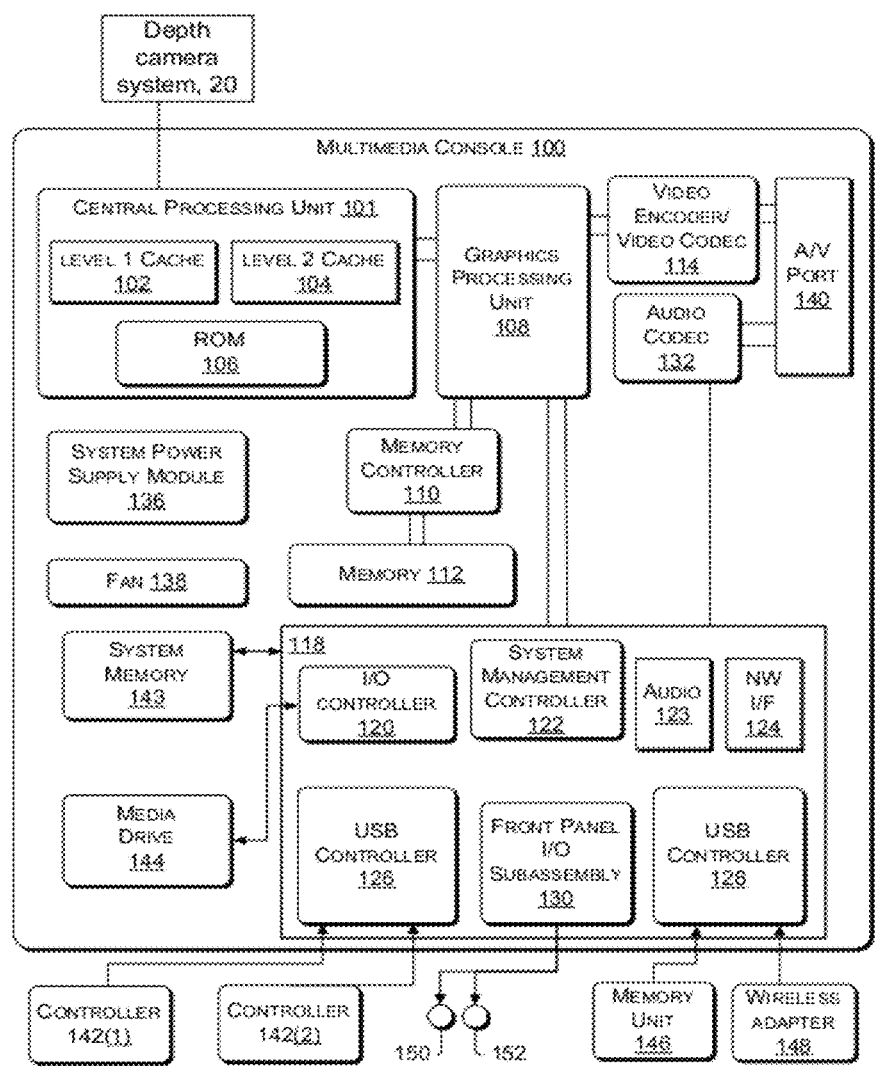
FIG. 16 depicts an example block diagram of a computing environment that may be used in the motion capture system of FIG. 14.

FIG. 16 depicts an example block diagram of a computing environment that may be used to generate and process sensor signals. The computing environment can be used in the motion capture system of FIG. 14. The computing environment may be used for a device 302 as depicted FIG. 1A or 1B. The computing environment such as the computing environment 12 described in FIG. 15 may include a multimedia console 100, such as a gaming console.

The console 100 may receive inputs from the depth camera system 20 of FIG. 15. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106 such as flash ROM may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory). The A/V port 140 may be connected to display 196.

The multimedia console 100 includes an I/O controller 120, a system management controller 122, an audio processing unit 123, a network interface 124, a first USB host controller 126, a second USB controller 128 and a front panel I/O subassembly 130 that may be implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high-speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation may be large enough to contain the launch kernel, concurrent system applications and drivers. The CPU reservation is may be constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory for an overlay may depend on the overlay area size and the overlay may scale with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications may be scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager may control the switching of input stream, without knowledge the gaming application's knowledge and a driver maintains state information regarding focus switches.

Figure 17:
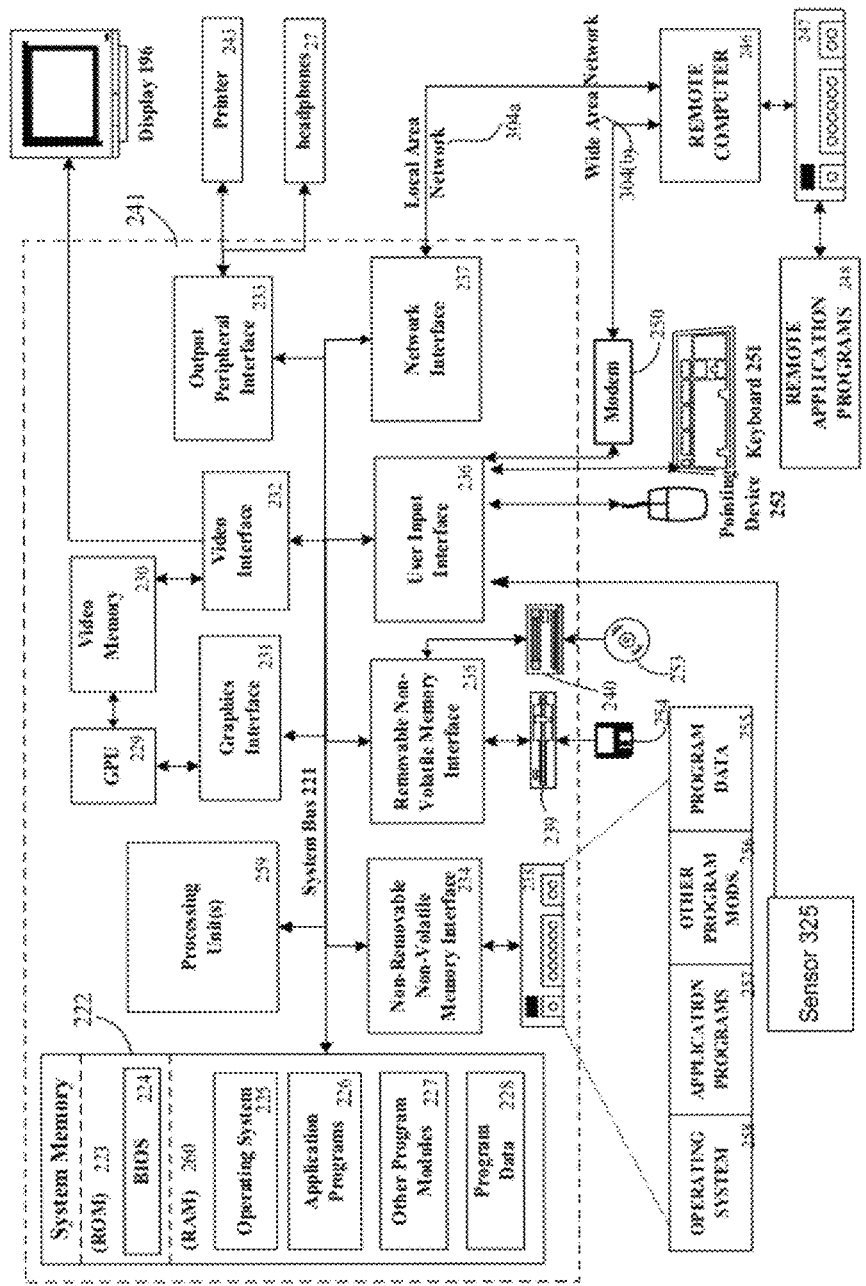
FIG. 17 depicts another example block diagram of a computing environment that may be used for publishing or subscribing devices.

FIG. 17 depicts another example block diagram of a computing environment that may be used to generate and process sensor signals. The computing environment may be used for one of the devices 302 in FIG. 1A or 1B, for example. The computing environment may also receive input from one or more sensors 325.

The computing environment 220 comprises a computer 241, which typically includes a variety of tangible computer readable storage media. This can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. A graphics interface 231 communicates with a GPU 229. By way of example, and not limitation, FIG. 17 depicts operating system 225, application programs 226, other program modules 227, and program data 228.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile tangible computer readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and depicted in FIG. 17, provide storage of computer readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A display 196 is also connected to the system bus 221 via an interface, such as a video interface 232. In addition to the monitor, computers may also include other peripheral output devices such as headphones 27 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been depicted in FIG. 12. The logical connections include a local area network (LAN) 304a and a wide area network (WAN) 304b, but may also include other networks. Such networking environments are commonplace in offices, enterprise-wide computer networks, intranets and the Internet.

When used in a LAN networking environment, the computer 241 is connected to the LAN 304a through a network interface or adapter 237. When used in a WAN networking environment, the computer 241 typically includes a modem 250 or other means for establishing communications over the WAN 304b, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 17 depicts remote application programs 248 as residing on memory device 247. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method comprising:
   determining, by a first electronic device, which sensor signals are available over one or more networks, each of the sensor signals is available from another electronic device that has a sensor from which the sensor signal is derived, wherein the sensor signals include a first type of signal for continuous signals and a second type of signal for state signals;
   subscribing, by the first electronic device, to a first sensor signal of the sensor signals;
   establishing a common time reference between the first electronic device a second electronic device that publishes the first sensor signal;
   receiving the first sensor signal at the first electronic device over the one or more networks, the first sensor signal including timing information, a continuous signal based on sensor data, and a state signal;
   synchronizing the data in the first sensor signal to a local clock at the first electronic using the common time reference, including:
   i) accessing samples and associated first time stamps in the continuous signal;
   ii) converting the first time stamps to local time using the common time reference; and
   iii) processing the first sensor signal at the first electronic device, the processing including extrapolating data in the continuous signal to predict a value for the continuous signal for a future point in time that is beyond any point in time for which the first device has received a value for the continuous signal;
   iv) accessing state information and associated second time stamps in the state signal;
   v) converting the second time stamps to local time using the common time reference; and
   vi) sending acknowledgments for state information that is received to the second electronic device that publishes the first sensor signal; and
   providing the synchronized data to an application on the first electronic device.

2. The method of claim 1, wherein the processing the first sensor signal includes interpolating the continuous signal.

3. The method of claim 1, wherein the extrapolating the data in the continuous signal includes determining values that are limited based on physical properties of subject matter represented by the continuous signal.

4. The method of claim 1, wherein the extrapolating the data in the continuous signal generates a first prediction, and further comprising:
   receiving one or more additional data samples for the continuous signal in the first signal;
   extrapolating the continuous signal based at least on the additional data samples to form a second prediction; and
   gradually merging the first prediction to the second prediction.

5. The method of claim 1, further comprising:
   requesting to subscribe to a second signal of the signals by the first device;
   receiving the second signal at the first device, the second signal including timing information and data based on sensor data; and
   synchronizing in time the data in the first signal with the data in the second signal.

6. The method of claim 1, wherein:
   the first sensor signal is received at the first electronic device using UDP.

7. An apparatus, comprising:
   a processor; and
   a computer readable storage medium coupled to the processor, the computer readable storage medium having instructions stored thereon which, when executed on the processor, cause the processor to:
   determine which sensor signals are available over one or more networks, the sensor signals are based on sensor data, the sensor signals include a first type of signal for continuous signals and a second type of signal for state signals;
   subscribe to a first sensor signal of the sensor signals;
   establish a common time reference with an electronic device that publishes the first sensor signal;
   receive the first sensor signal over the one or more networks, the first sensor signal including timing information, a continuous signal based on sensor data, and a state signal;
   synchronize the data in the first signal to a local clock using the common time reference, which includes the instructions causing the processor to;
   access samples and associated first time stamps in the continuous signal;
   convert the first time stamps to local time using the common time reference;
   extrapolate the continuous signal based on the samples in the continuous signal, including causing the processor to extrapolate data in the continuous signal to predict a value for the continuous signal for a future point in time that is beyond any point in time for which the apparatus has received a value for the continuous signal;
   access state information and associated second time stamps in the state signal;
   convert the second time stamps to local time using the common time reference; and
   send acknowledgments for state information that is received to the electronic device that publishes the first sensor signal; and
   provide the synchronized data to an application that executes on the processor.

8. The apparatus of claim 7, wherein the instructions that cause the processor to access state information and associated second time stamps in the state signal and to convert the second time stamps include instructions that cause the processor to:
   access commands in the first sensor signal;
   access a time stamp in the first sensor signal for each of the commands;
   convert the time stamp to local time; and
   store each of the commands in association with the respective local time for each command.

9. The apparatus of claim 7, wherein the instructions that cause the processor to provide the synchronized data to an application include instructions that cause the processor to:
   receive a request from the application for state information within a specified time period;
   access the stored signal data to find state information within the specified time period; and
   provide the state information for the specified time period to the application.

10. The apparatus of claim 7, wherein the instructions that cause the processor to provide the synchronized data to an application include instructions that cause the processor to:

receive a request from the application to detect an event;
monitor the first signal for occurrence of the event; and
report to the application in response to detecting that the first sensor signal indicates that the event occurred.

11. A computer readable storage device having instructions stored thereon which, when executed on a processor, cause the processor to:
- determine which sensor signals are available over one or more networks, the sensor signals are based on sensor data, the sensor signals include a first type of signal for continuous signals and a second type of signal for state signals;
- subscribe a first electronic device to a first sensor signal of the sensor signals;
- establish a common time reference between the first electronic device and a second electronic device that publishes the first sensor signal;

receive the first sensor signal at the first electronic device over the one or more networks, the first sensor signal including timing information, a continuous signal based on sensor data, and a state signal;
- synchronize the data in the first signal to a local clock at the first electronic device using the common time reference, which includes the instructions causing the processor to;
- access samples and associated first time stamps in the continuous signal;
- convert the first time stamps to local time using the common time reference;
- extrapolate the continuous signal based on the samples in the continuous signal, including causing the processor to extrapolate data in the continuous signal to predict a value for the continuous signal for a future point in time that is beyond any point in time for which first electronic device has received a value for the continuous signal;
- access state information and associated second time stamps in the state signal;
- convert the second time stamps to local time using the common time reference; and
- send acknowledgments for state information that is received to the second electronic device that publishes the first sensor signal; and provide the synchronized data to an application that executes on the processor.

* * * * *